(12) United States Patent
Xie et al.

(10) Patent No.: US 12,376,152 B2
(45) Date of Patent: Jul. 29, 2025

(54) COLLISION MITIGATION FOR A DUAL SUBSCRIBER IDENTITY MODULE (SIM) DUAL ACTIVE (DSDA) USER EQUIPMENT

(71) Applicant: QUALCOMM Incorporated, San Diego, CA (US)

(72) Inventors: Yong Xie, San Diego, CA (US); Vikram Singh, San Diego, CA (US); Lan Lan, San Diego, CA (US); Reza Shahidi, San Diego, CA (US); Zhibin Dang, San Diego, CA (US); Sanjeev Mittal, San Diego, CA (US); Carlos Marcelo Dias Pazos, Carlsbad, CA (US); Qingxin Chen, San Diego, CA (US); Bhupesh Manoharlal Umatt, Poway, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 17/653,370

(22) Filed: Mar. 3, 2022

(65) Prior Publication Data

US 2022/0338258 A1    Oct. 20, 2022

Related U.S. Application Data

(60) Provisional application No. 63/174,841, filed on Apr. 14, 2021.

(51) Int. Cl.
*H04W 74/0816*  (2024.01)
*H04W 72/0453*  (2023.01)
(Continued)

(52) U.S. Cl.
CPC .... *H04W 74/0816* (2013.01); *H04W 72/0453* (2013.01); *H04W 72/21* (2023.01); *H04W 72/56* (2023.01)

(58) Field of Classification Search
CPC ......... H04W 74/0816; H04W 72/0453; H04W 72/21; H04W 72/56; H04W 76/15; H04W 72/0446
See application file for complete search history.

(56) References Cited

U.S. PATENT DOCUMENTS 8,761,788 B2    6/2014  Rajurkar et al.
10,708,761 B1 *  7/2020  Yin ...................... H04W 8/205
(Continued)

FOREIGN PATENT DOCUMENTS

CN    101453509 A    6/2009
EP      2848045 A1    3/2015
(Continued)

OTHER PUBLICATIONS

International Search Report and Written Opinion—PCT/US2022/070959—ISA/EPO—Jul. 4, 2022.
(Continued)

*Primary Examiner* — Joseph E Avellino
*Assistant Examiner* — Anindita Sen
(74) *Attorney, Agent, or Firm* — Harrity & Harrity, LLP/Qualcomm

(57) ABSTRACT

This disclosure provides systems, methods and apparatuses for enabling collision mitigation for a user equipment (UE) operating in a dual active mode. In some aspects, the UE may generate a communication for a first subscription in a first time window associated with a first priority for a time domain division pattern with a second subscription. The UE may transmit, using the first subscription, the communication in a second time window associated with a second
(Continued)

priority for the time domain division pattern. For example, the second time window associated with the second priority may be a time window in which traffic for the first subscription is prioritized. In some aspects, the UE may select modified periodic intervals for transmissions of a communication to mitigate collisions associated with the time domain division pattern. For example, a transmission time of the periodic communication may be varied (or randomized) over time.

30 Claims, 16 Drawing Sheets

(51) Int. Cl.
*H04W 72/21* (2023.01)
*H04W 72/56* (2023.01)

(56) References Cited

U.S. PATENT DOCUMENTS

| | | |
|---|---|---|
| 2012/0231802 A1 | 9/2012 | Ngai |
| 2014/0315524 A1 | 10/2014 | Sinha et al. |
| 2015/0023230 A1 | 1/2015 | Hu et al. |
| 2016/0174187 A1 | 6/2016 | Gopala et al. |
| 2016/0282845 A1 | 9/2016 | Toda et al. |
| 2017/0208611 A1 | 7/2017 | Chincholi et al. |
| 2018/0027557 A1 | 1/2018 | Challa et al. |
| 2020/0413421 A1 | 12/2020 | Ozturk et al. |
| 2022/0072175 A1* | 3/2022 | Lovlekar ............ A61L 2/22 |
| 2022/0312531 A1* | 9/2022 | Lovlekar ............ H04W 76/20 |
| 2023/0007624 A1* | 1/2023 | Murray ............ H04W 68/005 |
| 2023/0180218 A1* | 6/2023 | Lovlekar ............ H04W 72/1268 370/329 |
| 2023/0396980 A1* | 12/2023 | Kanchiraju ............ H04W 8/183 |
| 2023/0396992 A1* | 12/2023 | Jiang ............ H04W 72/23 |
| 2023/0397162 A1* | 12/2023 | Hong ............ H04W 68/005 |
| 2024/0015498 A1* | 1/2024 | Juneja ............ H04W 72/56 |

FOREIGN PATENT DOCUMENTS

| | | |
|---|---|---|
| WO | WO-2013170185 A1 | 11/2013 |
| WO | WO-2015038236 A1 | 3/2015 |

OTHER PUBLICATIONS

Partial International Search Report—PCT/US2022/070959—ISA/EPO—May 30, 2022.

\* cited by examiner

COLLISION MITIGATION FOR A DUAL SUBSCRIBER IDENTITY MODULE (SIM) DUAL ACTIVE (DSDA) USER EQUIPMENT

CROSS-REFERENCE TO RELATED APPLICATION

This patent application claims priority to U.S. Provisional Patent Application No. 63/174,841, filed on Apr. 14, 2021, entitled "COLLISION MITIGATION FOR A DUAL SUBSCRIBER IDENTITY MODULE (SIM) DUAL ACTIVE (DSDA) USER EQUIPMENT," and assigned to the assignee hereof. The disclosure of the prior application is considered part of and is incorporated by reference into this patent application.

TECHNICAL FIELD

Aspects of the present disclosure relate generally to wireless communication and to techniques for collision mitigation for a dual subscriber identify module (SIM) dual active (DSDA) user equipment (UE).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include generating, for a first subscription in a dual active mode with a second subscription, a communication in a first time window associated with a first priority for a time domain division pattern with the second subscription; and transmitting, using the first subscription, the communication in a second time window associated with a second priority for the time domain division pattern.

In some aspects, the first priority is associated with a lower priority than the second priority for traffic of the first subscription. In some aspects, the communication may be a real-time transport protocol (RTP) control protocol (RTCP) communication, a real time text (RTT) communication, or a session initiation protocol (SIP) communication. In some aspects, generating the communication may include delaying the communication until after the first time window associated with the first priority for the time domain division pattern associated with the active voice or video call. In some aspects, transmitting the communication may include transmitting the communication after the first time window associated with the first priority.

In some aspects, transmitting the communication may include selecting a scheduling request for the communication that is aligned with a low priority time window for traffic associated with the second subscription; transmitting the scheduling request for the communication; and transmitting the communication in the second time window associated with the second priority based on transmitting the scheduling request.

In some aspects, transmitting the communication may include obtaining the communication from a buffer after the first time window associated with the first priority for the time domain division pattern; and transmitting the communication in the second time window associated with the second priority based on obtaining the communication from the buffer after the first time window associated with the first priority.

Another innovative aspect of the subject matter described in this disclosure can be implemented in a method of wireless communication performed by an apparatus of a UE. The method may include selecting, for a first subscription in a dual active mode with a second subscription, a modified periodic interval for a communication that is associated with a periodic interval; and transmitting, using the first subscription, the communication at a time that is associated with the modified periodic interval.

In some aspects, selecting the modified periodic interval may include modifying the periodic interval by a value to obtain the modified periodic interval; and generating the communication at the time associated with the modified periodic interval. In some aspects, selecting the modified periodic interval may include selecting a value from a range of values; modifying the periodic interval by the value to obtain the modified periodic interval; and generating the communication at the time associated with the modified periodic interval.

In some aspects, the method may include selecting, for the first subscription, a different modified periodic interval for a different communication that is associated with the periodic interval; and transmitting, using the first subscription, the different communication at a time that is associated with the different modified periodic interval.

Another innovative aspect of the subject matter described in this disclosure can be implemented in an apparatus of a UE for wireless communication. The apparatus may include a processing system configured to generate, for a first subscription in a dual active mode with a second subscription, a communication in a first time window associated with a first priority for a time domain division pattern with the second subscription. The apparatus may include a first interface configured to output, using the first subscription, the communication in a second time window associated with a second priority for the time domain division pattern.

Another innovative aspect of the subject matter described in this disclosure can be implemented in an apparatus of a UE for wireless communication. The apparatus may include a processing system configured to select, for a first subscription in a dual active mode with a second subscription, a modified periodic interval for a communication that is associated with a periodic interval. The apparatus may include a first interface configured to output, using the first subscription, the communication at a time that is associated with the modified periodic interval.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to generate, for a first subscription in a dual active mode with a second subscription, a communication in a first time window associated with a first priority for a time domain division pattern with the second subscription; and transmit, using the first subscription, the communication in a second time window associated with a second priority for the time domain division pattern.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to select, for a first subscription in a dual active mode with a second subscription, a modified periodic interval for a communication that is associated with a periodic interval; and transmit, using the first subscription, the communication at a time that is associated with the modified periodic interval.

Another innovative aspect of the subject matter described in this disclosure can be implemented in an apparatus for wireless communication. The apparatus may include means for generating, for a first subscription in a dual active mode with a second subscription, a communication in a first time window associated with a first priority for a time domain division pattern with the second subscription; and means for transmitting, using the first subscription, the communication in a second time window associated with a second priority for the time domain division pattern.

Another innovative aspect of the subject matter described in this disclosure can be implemented in an apparatus for wireless communication. The apparatus may include means for selecting, for a first subscription in a dual active mode with a second subscription, a modified periodic interval for a communication that is associated with a periodic interval; and means for transmitting, using the first subscription, the communication at a time that is associated with the modified periodic interval.

In some aspects, the apparatus of the UE, such as a processing system of the apparatus or one or more interfaces of the apparatus, among other examples, may be configured to perform one or more operations of the method of wireless communication performed by the apparatus.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
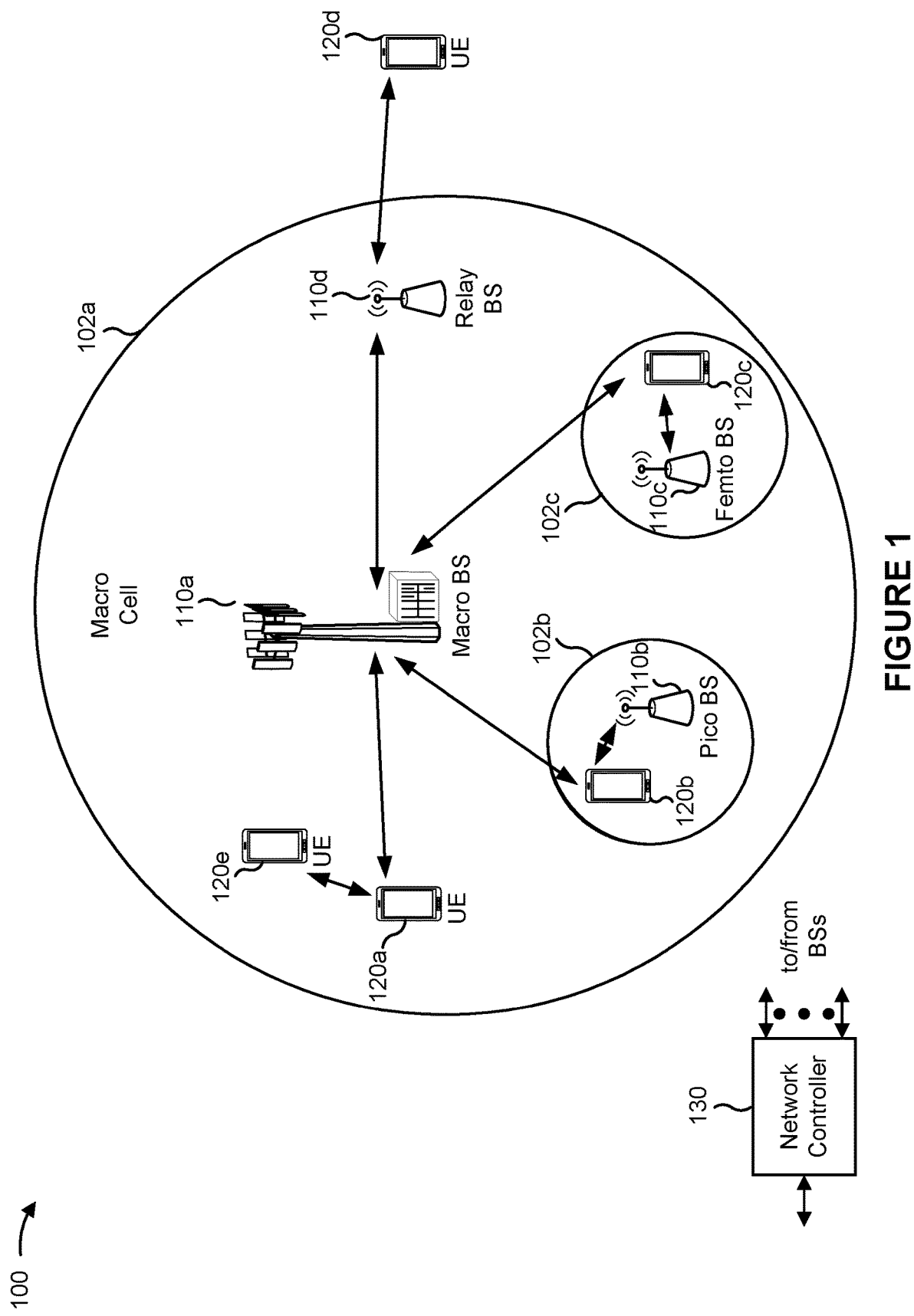
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G technology, 4G technology, 5G technology, or further implementations thereof.

In some cases, a UE may be a multiple subscriber identity module (SIM) (multi-SIM) UE that includes multiple SIMs (two or more SIMs). Each SIM may be associated with a subscription (for example, with a network operator). In some cases, the UE may be capable of operating in a multi-SIM multiple active (MSMA) mode, such as a dual SIM dual active (DSDA) mode (for example, when the UE is associated with two subscriptions). In a DSDA mode, the UE may be capable of concurrent active communication using both SIMs of the UE. Thus, a UE in the DSDA mode may be capable of communicating using a first SIM (and a first subscription) at the same time (or substantially the same time) as communicating using a second SIM (and a second subscription).

However, in some cases, the UE may be associated with, or experience, one or more limitations that limit (or prevent) concurrent activity on the first subscription of the UE and on the second subscription of the UE when operating in the DSDA mode. "Limitation" may refer to a condition experienced by, or configuration of, the UE that may result in, or cause, a degradation of communication performance if the UE were to transmit (or receive) on both the first subscription and the second subscription at substantially the same time (for example, during times that at least partially overlap). In some cases, the UE (operating in the DSDA mode) may operate in a transmit sharing mode. "Transmit sharing mode" may refer to a mode of operation that enables the UE to share resources (for example, time domain resources or frequency domain resources) for two or more subscriptions in a DSDA mode. In some cases, the multi-SIM UE may determine (or receive an indication of) a time domain division pattern (for example, a time division duplex (TDD) pattern) associated with a first subscription and a second subscription. The time domain division pattern may enable the UE to maintain active sessions on both the first subscription and the second subscription while also avoiding degradation of communication performance due to a limitation, as described herein.

However, in some cases, the UE may generate, for a subscription, a signal or packet for a communication in a time window of the time domain division pattern in which traffic for the subscription is deprioritized (for example, in accordance with the time domain division pattern). Generating a signal or packet for a communication in a time window of the time domain division pattern in which traffic for the subscription is deprioritized may be referred to herein as a collision associated with the time domain division pattern.

For example, for some active sessions (such as a voice call or a video call) the UE may transmit communications periodically (such as real-time transport protocol (RTP) control protocol (RTCP) communications) associated with the active session that may be generated in the time window of the time domain division pattern in which traffic for the subscription associated with the active session is deprioritized. Additionally, or alternatively, the UE may dynamically generate a communication (for example, a real-time text (RTT) or a session initiation protocol (SIP) communication) in the time window of the time domain division pattern in which traffic for the subscription is deprioritized. As a result, the UE may not transmit (for example, may drop) the communication that is generated in the time window of the time domain division pattern in which traffic for the subscription is deprioritized. This may cause the communication to be lost (for example, not transmitted or retransmitted) as some communications may not be associated with acknowledgement feedback or retransmissions (such as RTCP communications or RTT communications). Moreover, even if the UE is enabled to transmit a retransmission of the communication (for example, for a SIP communication), the collision may introduce latency associated with transmitting the retransmission. As a result, collisions associated with the time domain division pattern for the transmit sharing mode of a UE may cause communications to be lost (for example, not transmitted and not retransmitted) or may introduce latency or signaling delay. This may result in a degradation of a communication performance of the UE (for example, operating in the DSDA mode and the transmit sharing mode).

Some implementations and techniques described herein may enable collision mitigation for a UE operating in the DSDA mode. For example, the UE may generate (such as in one or more layers of the UE) a communication for a first subscription in a time window associated with a first priority for a time domain division pattern with a second subscription. For example, the time window associated with the first priority may be a time window in which traffic for the first subscription is deprioritized as compared to traffic for the second subscription in accordance with the time domain division pattern. The UE may transmit, using the first subscription, the communication in a time window associated with a second priority for the time domain division pattern. For example, the time window associated with the second priority may be a time window in which traffic for the first subscription is prioritized as compared to traffic for the second subscription in accordance with the time domain division pattern. For example, the UE may delay a transmission of the communication until the time window associated with the second priority.

In some aspects, the UE may delay the transmission of the communication until the time window associated with the second priority by an application layer of the UE. For example, if the first subscription is associated with an active call, the UE may delay a transmission (by refraining from passing information associated with the communication from the application layer to one or more lower layers) until the time window associated with the second priority (a high priority window associated with the active call). If the first subscription is associated with a non-active call, the UE may delay a transmission (by refraining from passing information associated with the communication from the application layer to one or more lower layers) until the time window associated with the second priority (a low priority window associated with an active call of a second subscription) by selecting and transmitting a scheduling request for the communication that occurs in the time window associated with the second priority. Additionally, or alternatively, the UE may delay the transmission of the communication until the time window associated with the second priority by a lower layer of the UE. For example, the UE may refrain from obtaining data for the communication from a buffer until the time window associated with the second priority.

Additionally, or alternatively, the UE may modify a periodic interval for transmissions of a communication (such as an RTCP communication) to mitigate collisions associated with the time domain division pattern. For example, the UE may generate a signal for a communication or may generate a packet for a communication (for example, an RTCP communication associated with a periodic interval) at a time associated with a modified periodic interval. In some aspects, the UE may select a random value and may modify the periodic interval by the random value. Therefore, a transmission time of the periodic transmission may be varied (or randomized) over time.

Particular implementations of the subject matter described in this disclosure can be implemented to realize one or more of the following potential advantages. In some aspects, implementations may ensure that a communication (for example, an RTCP communication, an RTT communication, or an SIP communication, among other examples) for a subscription is transmitted in a time window in which traffic for the subscription is prioritized in accordance with a time domain division pattern of a transmit sharing mode. With this approach, the communication is not dropped (for example, not transmitted) nor lost by enabling the UE to transmit the communication in the time window associated with the second priority. Moreover, this approach may reduce latency and signaling delays associated with transmitting a retransmission of the communication.

Additionally, or alternatively, by modifying a periodic interval of the communication by a random value, the UE may reduce a likelihood that the communication is generated (or transmitted) in a time window associated with a deprioritization of the traffic for the subscription (for example, in accordance with the time domain division pattern associated with the transmit sharing mode). Reducing the likelihood that the communication is generated (or transmitted) in a time window associated with a deprioritization of the traffic for the subscription may increase a likelihood that the UE is enabled to transmit the communication in accordance with the time domain division pattern. This may improve communication performance of the UE by increasing the likelihood that the UE is enabled to transmit the communication (for example, the RTCP communication) that would have otherwise been lost (not transmitted and not retransmitted).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network entities, such as one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an example of a network entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some aspects, the term "base station" (for example, the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

Figure 2:
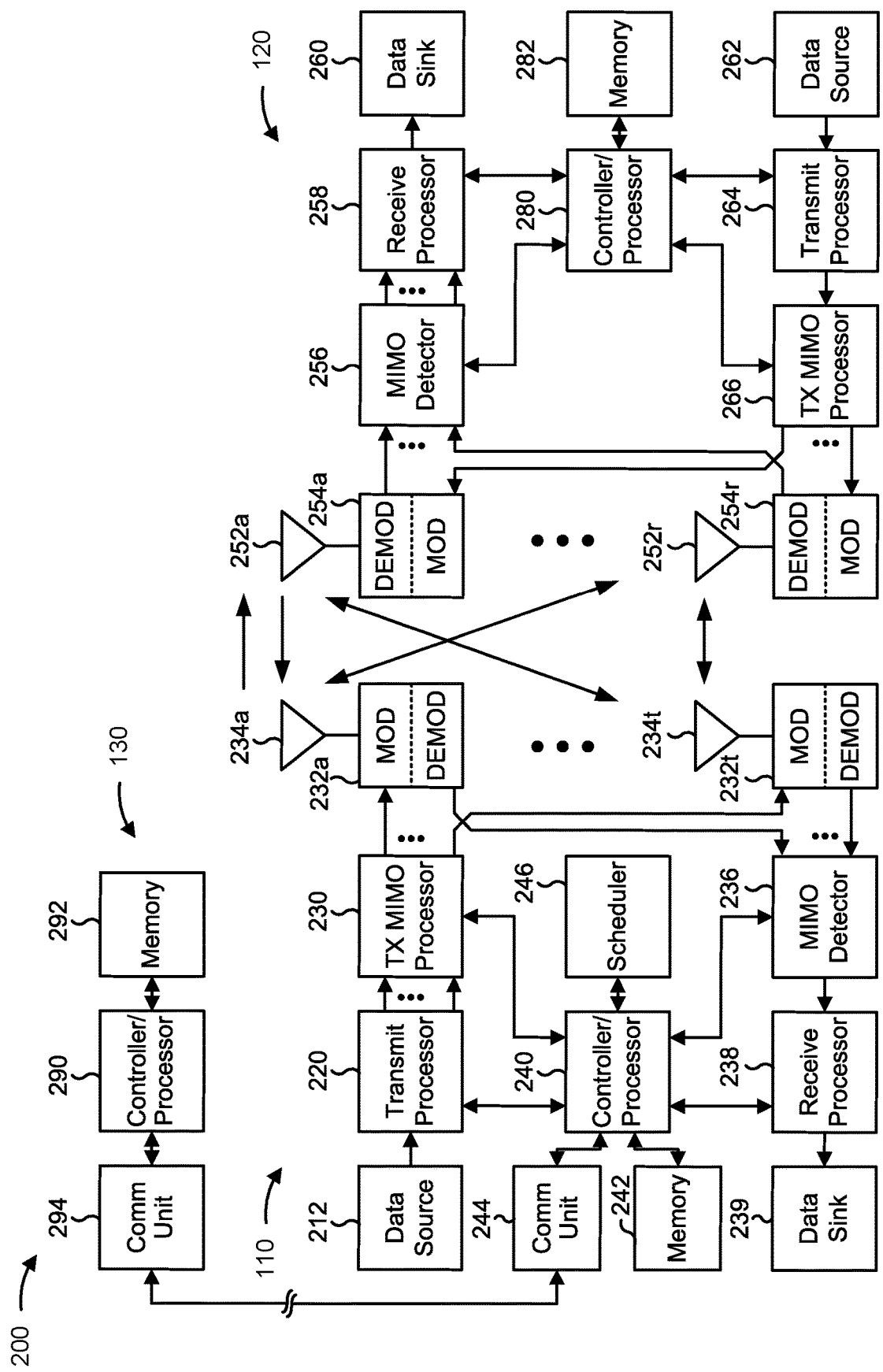
FIG. 2 is a diagram illustrating an example of a base station (BS) in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the base station 110). For example, a processing system of the base station 110 may be a system that includes the various other components or subcomponents of the base station 110.

The processing system of the base station 110 may interface with one or more other components of the base station 110, may process information received from one or more other components (such as inputs or signals), or may output information to one or more other components. For example, a chip or modem of the base station 110 may include a processing system, a first interface to receive or obtain information, and a second interface to output, transmit, or provide information. In some examples, the first interface may be an interface between the processing system of the chip or modem and a receiver, such that the base station 110 may receive information or signal inputs, and the information may be passed to the processing system. In some examples, the second interface may be an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with collision mitigation for a DSDA UE, as described in more detail elsewhere herein. For example, the controller/processor 240 of the base station 110, the controller/processor 280 of the UE 120, or any other component(s) (or combinations of components) of FIG. 2 may perform or direct operations of, for example, process 800 of FIG. 8, process 900 of FIG. 9, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions.

In some aspects, the UE 120 includes means for generating, for a first subscription in a dual active mode with a second subscription, a communication in a first time window associated with a first priority for a time domain division pattern with the second subscription; or means for transmitting, using the first subscription, the communication in a second time window associated with a second priority for the time domain division pattern. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for selecting, for a first subscription in a dual active mode with a second subscription, a modified periodic interval for a communication that is associated with a periodic interval; or means for transmitting, using the first subscription, the communication at a time that is associated with the modified periodic interval. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (for example, base station 110), or one or more units (or one or more components) performing base station functionality, may be implemented in an aggregated or disaggregated architecture. For example, a BS (such as a Node B (NB), eNB, NR BS, 5G NB, gNodeB (gNB), access point (AP), a TRP, or a cell, among other examples) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
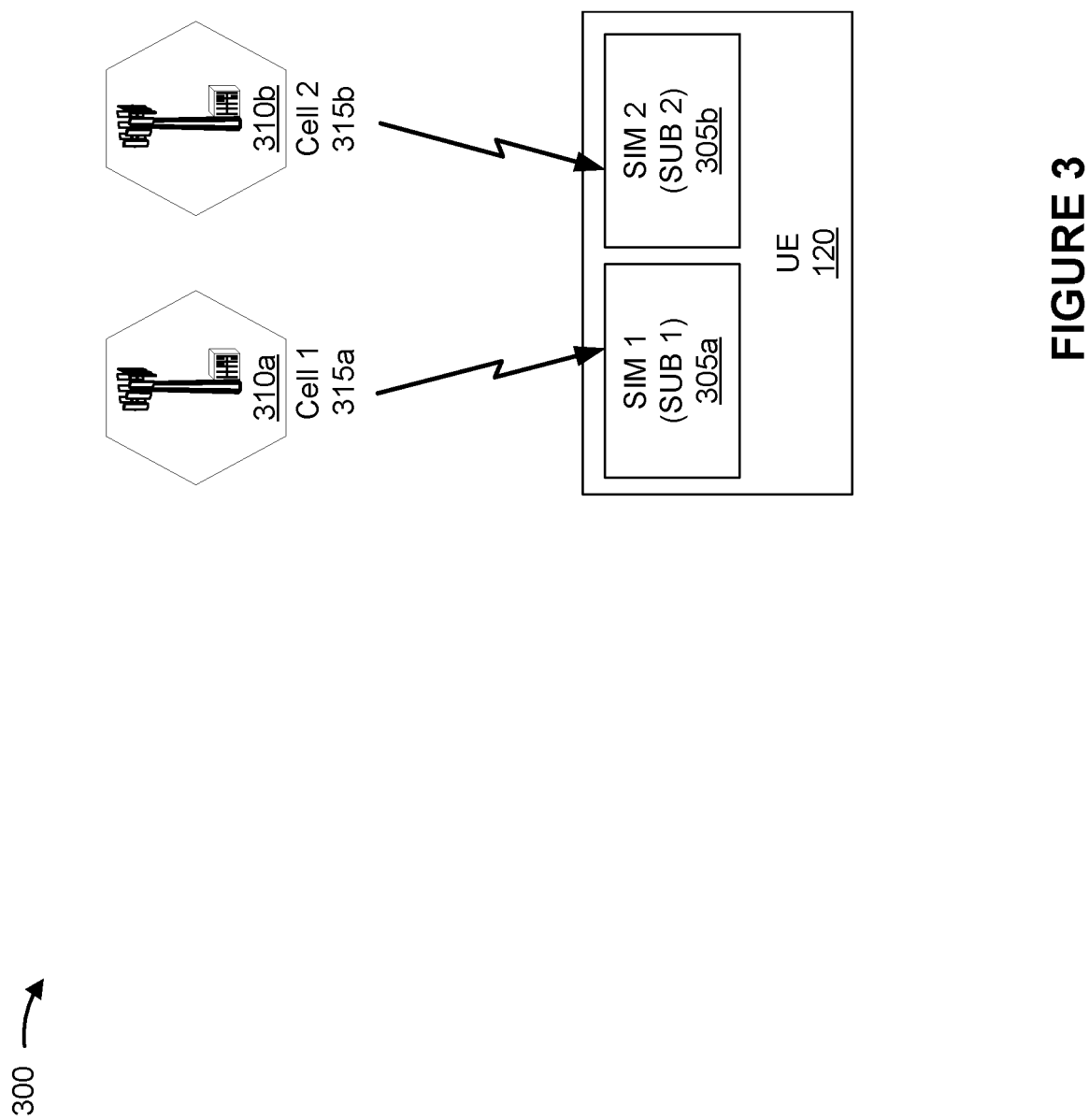
FIG. 3 is a diagram illustrating an example of a multiple subscriber identity module (multi-SIM) UE.

FIG. 3 is a diagram illustrating an example 300 of a multi-subscriber identity module (SIM) UE. As shown in FIG. 3, a UE 120 (such as the UE 120 described in FIGS. 1 and 2) may be a multiple SIM (multi-SIM) UE that includes multiple SIMS (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator. "Subscription" and "SIM" may be used interchangeably herein.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be capable of operating in a multi-SIM multiple standby (MSMS) mode, such as a dual SIM dual standby (DSDS) mode (for example, when the UE 120 is associated with two subscriptions). Additionally, or alternatively, the UE 120 may be capable of operating in a multi-SIM multiple active (MSMA) mode, such as a dual SIM dual active (DSDA) mode (for example, when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (for example, a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMs of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315a (as well as the first SIM 305a and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305a and the first subscription) uses an NR RAT and the second cell 315b (as well as the second SIM 305b and the second subscription) uses an LTE RAT (or vice versa). In some examples, the UE 120 may not be capable of operating in the DSDA mode for the second combination of RATs (for example, NR+LTE), but be capable of operating in a DSDS mode for the second combination of RATs. This UE design reduces design costs as compared to enabling the UE 120 to operate using the DSDA mode for the second combination of RATs.

Figure 4:
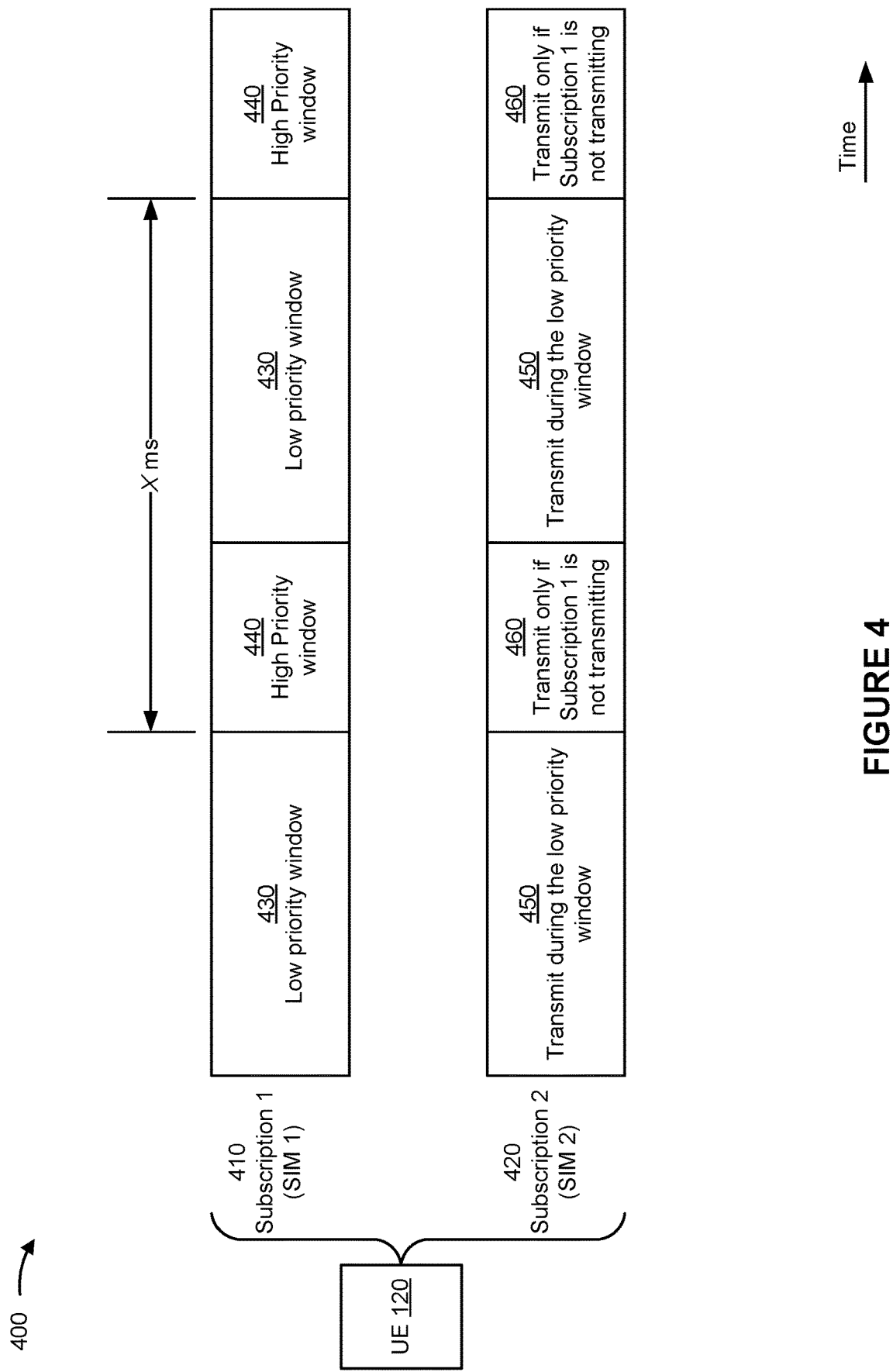
FIG. 4 is a diagram illustrating an example of a time domain division pattern for a multi-SIM

FIG. 4 is a diagram illustrating an example 400 of a time domain division pattern for a multi-SIM UE. As shown in FIG. 4, a time domain division pattern for a UE 120 (such as the UE 120 depicted in, and described in connection with, FIGS. 1-3) may be associated with a first subscription 410 (for example, associated with a first SIM of the UE 120) and a second subscription 420 (for example, associated with a second SIM of the UE 120). For example, the UE 120 may be a multi-SIM UE in a similar manner as described in connection with FIG. 3. In some cases, the UE 120 may be configured to operate in a DSDA mode.

However, in some cases, the UE 120 may be associated with one or more limitations that limit concurrent activity on the first subscription 410 and the second subscription 420. As noted above, "limitation" may refer to a condition or configuration of the UE 120 that would result in a degradation of communication performance if the UE 120 were to transmit (or receive) on both the first subscription 410 and the second subscription 420 at the same time (for example, during times that at least partially overlap). In some cases, a limitation may be a hardware limitation. For example, the first subscription 410 and the second subscription 420 may share one or more hardware components (such as an antenna, a radio frequency (RF) component, an antenna switch, or an amplifier, among other examples) of the UE 120 such that a concurrent transmission on both the first subscription 410 and the second subscription 420 may result in a degradation of communication performance. As another example, a limitation may be a band limitation (for example, a frequency band limitation or an RF limitation). For example, a frequency band used by the first subscription 410 and a frequency band used by the second subscription 420 may be the same frequency band, may be included in the same frequency band group, or may be associated with similar frequency ranges (or overlapping frequency ranges) such that a concurrent transmission on both the first subscription 410 and the second subscription 420 may result in a degradation of communication performance.

Therefore, in some cases, the UE 120 (operating in the DSDA mode) may operate in a transmit sharing mode. "Transmit sharing mode" refers to a mode of operation that enables the UE 120 to share resources (for example, time domain resources or frequency domain resources) for two or more subscriptions in a dual active mode. For example, in a transmit sharing mode, the UE 120 may share resources (for example, time domain resources or frequency domain resources) for two or more subscriptions based on traffic priority. In some cases, the UE 120 may determine (or receive an indication of) a time domain division pattern (for example, a time division duplex (TDD) pattern) associated with the first subscription 410 and the second subscription 420. The time domain division pattern may enable the UE 120 to maintain active sessions on both the first subscription 410 and the second subscription 420 while also avoiding degradation of communication performance due to a limitation, as described above.

For example, as shown in FIG. 4, a transmit sharing mode may enable the UE 120 to partition time domain resources between the first subscription 410 and the second subscription 420. In some cases, the UE 120 may partition the time domain resources between the first subscription 410 and the second subscription 420 based on a traffic priority. For example, for the first subscription 410, the UE 120 may configure or determine a time domain division pattern that includes one or more low priority windows 430 and one or more high priority windows 440. For example, a window of X milliseconds (such as 40 milliseconds) may include a high priority window 440 and a low priority window 430. The high priority window 440 may be associated with a duration of Y milliseconds (such as 10 milliseconds) and the low priority window may be associated with a duration of Z milliseconds (such as 30 milliseconds) (for example, such that Y+Z=X). As shown in FIG. 4, the window of X milliseconds may repeat over time in accordance with the time domain division pattern. For example, the first subscription 410 may be associated with periodic or deterministic traffic (such as an active voice call or an active video call that is associated with periodic traffic) and the second subscription 420 may be associated with another active session (such as an online gaming session). For example, an active voice call or video call may be associated with periodic traffic that occurs every X milliseconds. Therefore, the time domain division pattern may be configured such that high priority windows 440 occur every X milliseconds to enable the UE 120 to transmit the periodic traffic associated with the first subscription 410 (for example, during a high priority window 440, as described herein) and transmit traffic associated with the second subscription 420 (for example, during a low priority window 430, as described herein).

For example, during a high priority window 440, traffic for the first subscription 410 may be prioritized over traffic for the second subscription 420. During a low priority window 430, traffic for the second subscription 420 may be prioritized over traffic for the first subscription 410. Therefore, as shown by reference number 450, the UE 120 may be enabled to transmit traffic for the second subscription 420 during a low priority window 430 (for example, a low priority window for the first subscription 410). Similarly, the UE 120 may be enabled to transmit traffic for the first subscription 410 during a high priority window 440 (for example, a high priority window for the first subscription 410). As shown by reference number 460, during a high priority window 540, the UE 120 may transmit traffic for the second subscription 420 only if there are no transmissions occurring or scheduled associated with the first subscription 410. Therefore, for the duration of a high priority window 440, the UE 120 may be enabled to transmit traffic associated with the first subscription 410. Similarly, for the duration of a low priority window 430, the UE 120 may be enabled to transmit traffic associated with the second subscription 420. As a result, the UE 120 may be enabled to maintain active sessions on both the first subscription 410 and the second subscription 420 by using the time domain division pattern (for example, in the DSDA mode and the transmit sharing mode) when the UE 120 is associated with one or more limitations that limit (or prevent) concurrent transmissions on both the first subscription 410 and the second subscription 420.

Figure 5:
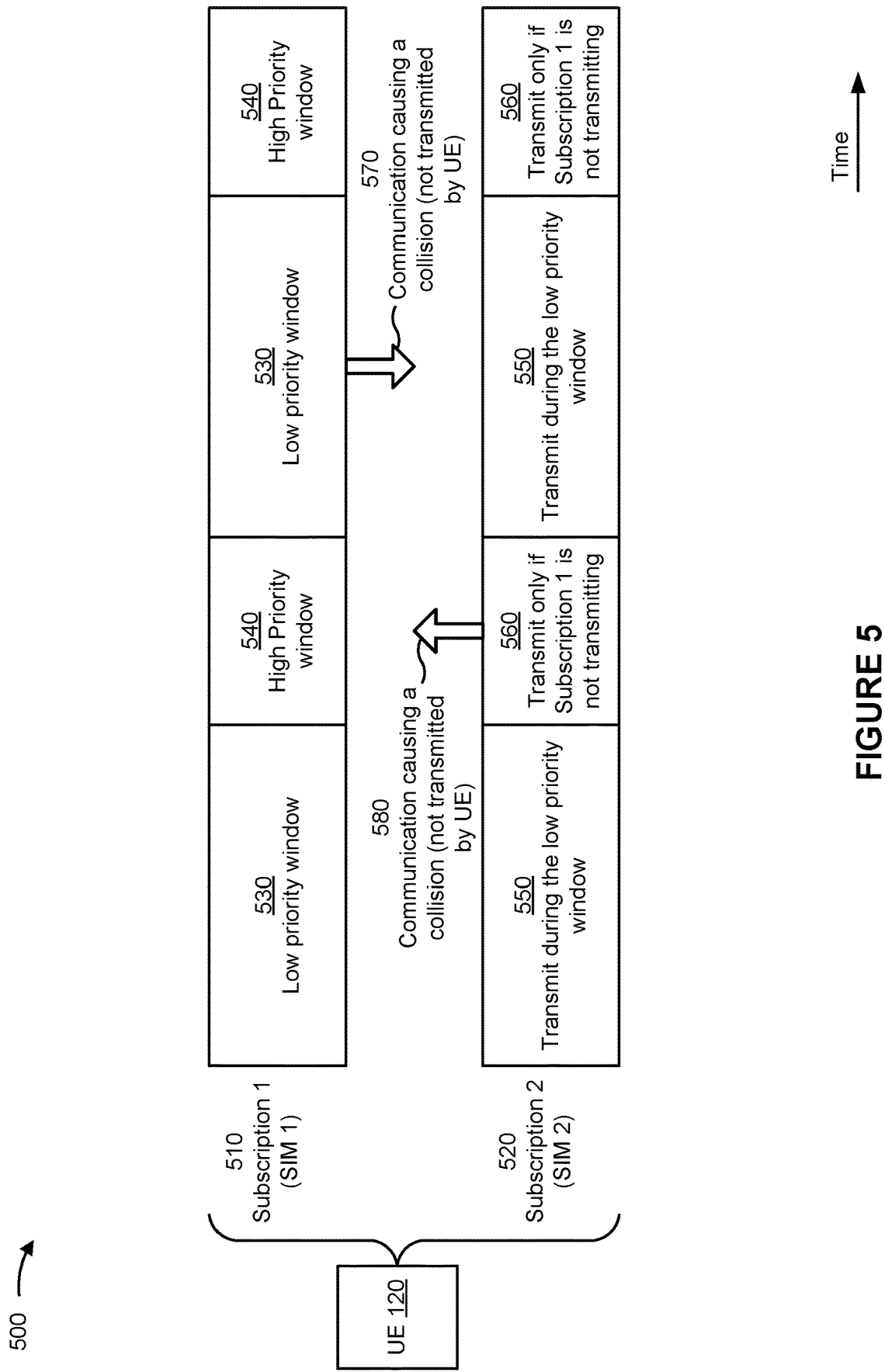
FIG. 5 is a diagram illustrating an example of collisions associated with a time domain division pattern for a multi-SIM UE.

FIG. 5 is a diagram illustrating an example 500 of collisions associated with a time domain division pattern for a multi-SIM UE. As shown in FIG. 5, a time domain division pattern for a UE 120 (such as the UE 120 depicted in, and described in connection with, FIGS. 1-4) may be associated with a first subscription 510 (for example, associated with a first SIM of the UE 120) and a second subscription 520 (for example, associated with a second SIM of the UE 120). In some cases, the UE 120 may be a multi-SIM UE in a similar manner as described above in connection with FIGS. 3 and 4. In some cases, the UE 120 may be configured to operate in a DSDA mode.

In some cases, the UE 120 may be operating in a transmit sharing mode, as described in connection with FIG. 4. For example, as shown in FIG. 4, the UE 120 may configure or determine a time domain division pattern that includes one or more low priority windows 530 and one or more high priority windows 540 for the first subscription 510 (in a similar manner as described above in connection with FIG. 4). As shown by reference number 550, the UE 120 may be enabled to transmit traffic for the second subscription 520 during a low priority window 530 (for example, a low priority window for the first subscription 510). Similarly, the UE 120 may be enabled to transmit traffic for the first subscription 510 during a high priority window 540 (for example, a high priority window for the first subscription 510). As shown by reference number 560, during a high priority window 540, the UE 120 may transmit traffic for the second subscription 520 only if there are no transmissions occurring or scheduled associated with the first subscription 510. This may enable the UE 120 to maintain active sessions on both the first subscription 510 and the second subscription 520, as described herein.

However, in some cases, the UE 120 may generate, for a subscription, a signal for a communication in a time window in which traffic for the subscription is deprioritized (for example, in accordance with the time domain division pattern). For example, for some active sessions (such as a voice call or a video call) the UE 120 may transmit communications periodically associated with the active session. For example, the UE 120 may periodically transmit control information associated with the active session (such as control information for a voice call or video call). In some cases, the UE 120 may be configured to transmit real-time transport protocol (RTP) control protocol (RTCP) communications periodically (such as every 1 second, every 2 seconds, or every 5 seconds, etc.) associated with an active session.

As another example, a real-time text (RTT) communication for a subscription may be generated in a time window in which traffic for the subscription is deprioritized (for example, in accordance with the time domain division pattern). For example, RTT communications may be generated at any time (such as when the UE 120 receives an input associated with the RTT communication). Therefore, RTT communications may be generated by the UE 120 in a time window in which traffic for the subscription is deprioritized. As another example, a session initiation protocol (SIP) communication for a subscription may be generated in a time window in which traffic for the subscription is deprioritized (for example, in accordance with the time domain division pattern). For example, SIP communications may be used for initiating, maintaining, or terminating real-time sessions, such as voice sessions, video sessions, or messaging sessions, among other examples. SIP communications may be generated by the UE 120 at any time, such as for Internet protocol multimedia subsystem (IMS) registration (or re-registration), or call control communications, among other examples. Therefore, a SIP communication may be generated by the UE 120 in a time window in which traffic for the subscription is deprioritized.

In some cases, the communications described above may be dropped (for example, not transmitted) or discarded based on being generated in a time window in which traffic for the subscription is deprioritized. For example, a communication 570 may be generated for the first subscription 510 that causes a collision associated with the time domain division pattern. In other words, the communication 570 may be generated by the UE 120 in a low priority window 530 (for example, in a time window during which the UE 120 is configured to transmit communications associated with the second subscription 520). Therefore, to avoid a collision with a transmission of traffic for the second subscription 520, the UE 120 may not transmit the communication 570. The communication 570 may be an RTCP communication, an RTT communication, or a SIP communication, among other examples.

As another example, a communication 580 may be generated for the second subscription 520 that causes a collision associated with the time domain division pattern. For example, the communication 580 may be generated by the UE 120 in a high priority window 540 (for example, in a time window during which the UE 120 is configured to transmit communications associated with the first subscription 510). Therefore, to avoid a collision with a transmission of traffic for the first subscription 510, the UE 120 may not transmit the communication 580. The communication 580 may be an RTCP communication, an RTT communication, or a SIP communication, among other examples.

In some cases, the communication (for example, the communication 570 or the communication 580) may be transmitted without requesting acknowledgement feedback from a receiving device. For example, the communication may be transmitted using a radio link control (RLC) unacknowledged mode (RLC-UM) or a user datagram protocol (UDP). For example, the RLC-UM or the UDP may be used by the UE 120 for delay sensitive communications, such as voice call or video call sessions. For example, RTCP communications or RTT communications may be transmitted using the RLC-UM or the UDP. Therefore, the UE 120 may not be enabled to transmit retransmissions of the communication using the RLC-UM or the UDP. As a result, the communication that is not transmitted because of the collision (for example, the communication 570 or the communication 580) may be lost, as retransmissions of the communication may not be allowed.

Moreover, even if the UE 120 is enabled to transmit a retransmission of the communication (for example, the communication 570 or the communication 580), the collision may introduce latency associated with transmitting the retransmission. For example, the communication may be transmitted using an RLC acknowledged mode (RLC-AM) or a transmission control protocol (TCP) in which acknowledgment feedback is provided associated with the communication. For example, a SIP communication may be transmitted using an RLC-AM or a TCP. However, if the UE 120 does not transmit the communication (for example, because of a collision associated with the time domain division pattern), the UE 120 may receive a negative acknowledgement message, may schedule a retransmission of the communication, and may transmit the retransmission of the communication. This introduces signaling delay because the UE 120 may need to wait for the negative acknowledgement message, may need to schedule the retransmission at a next available transmission opportunity (for example, which may not occur for some amount of time). As a result, collisions associated with the time domain division pattern for the transmit sharing mode of a UE 120 may cause communications to be lost (for example, not transmitted and not retransmitted) or may introduce latency or signaling delay. This may result in a degradation in a communication performance of the UE 120 (for example, operating in the DSDA mode).

Figure 6:
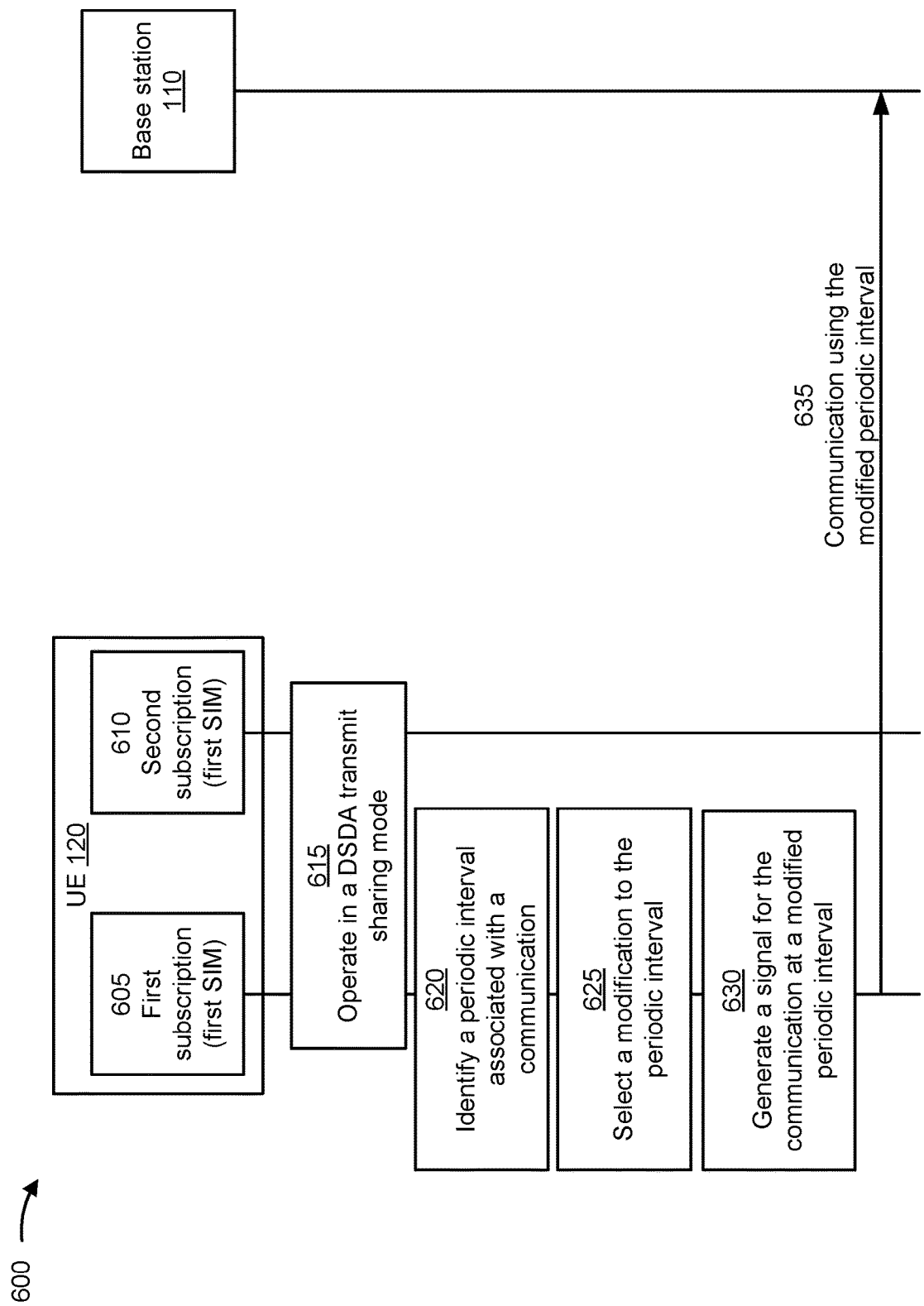
FIG. 6 is a diagram illustrating an example of collision mitigation for a dual SIM dual active (DSDA) mode.

FIG. 6 is a diagram illustrating an example 600 of collision mitigation for a DSDA mode. As shown in FIG. 6, a UE 120 (such as the UE 120 depicted in, and described in connection with, FIGS. 1-5) may be a multi-SIM UE (such as the multi-SIM UE depicted in, and described in connection with, FIGS. 3-5). For example, the UE 120 may include a first subscription 605 (for example, associated with a first SIM of the UE 120) and a second subscription 610 (for example, associated with a second SIM of the UE 120). The UE 120 may communicate with a base station 110 (such as the base station 110 depicted in, and described in connection with, FIGS. 1 and 2) using a wireless network, such as the wireless network 100. Although a single base station 110 is depicted in FIG. 6, the UE 120 may communicate with multiple base stations 110 (for example, one base station 110 for each subscription).

As shown by reference number 615, the UE 120 may be configured to operate in a DSDA mode and in a transmit sharing mode. For example, the UE 120 may be capable of concurrent active communication using both subscriptions (both SIMs) of the UE 120. However, the UE 120 may be associated with one or more limitations that inhibit (or prevent) concurrent transmission of communications using both subscriptions (both SIMS) (for example, associated with a transmit sharing mode as described herein). Therefore, the UE 120 may determine (or receive an indication of) a time domain division pattern associated with sharing time domain resources between the first subscription 605 and the second subscription 610 in the DSDA mode. For example, the UE 120 may determine (or receive an indication of) a time domain division pattern in a similar manner as described in connection with FIGS. 4 and 5.

In some aspects, the time domain division pattern may be associated with a periodicity of high priority time windows for a subscription (for example, for a subscription associated with an active voice call session or an active video call session). For example, an active voice call session or active video call session may be associated with periodic traffic (for example, a voice call packet or a video call packet) that occurs every X milliseconds (such as every 40 milliseconds). Therefore, the time domain division pattern may be configured such that high priority time windows occur every X milliseconds to enable the UE 120 to transmit the traffic associated with the subscription (for example, during a high priority time window, as described herein). In some aspects, the first subscription 605 may be associated with a voice call or a video call (for example, an active call, or an idle or on hold call). Therefore, the UE 120 may transmit RTCP communications (for example, periodically) for the first subscription 605 to indicate control information for the voice call or video call associated with the first subscription 605.

As shown by reference number 620, the UE 120 may identify a periodic interval associated with a communication for the first subscription 605 (or the second subscription 610 if the second subscription 610 is associated with a call session). For example, the first subscription 605 may be associated with an active session in which communications (for example, control communications) are transmitted periodically. In some aspects, the communication may be an RTCP communication. For example, as described herein, RTCP communications may be transmitted in accordance with a periodic interval (such as 1 second, 2 seconds, or 5 seconds, among other examples) for voice call sessions or video call sessions, among other examples. For example, the first subscription 605 may be associated with a voice call session or a video call session in which the UE 120 transmits RTCP communications for the voice call session or the video call session in accordance with a periodic interval (for example, to indicate control information associated with the voice call session or the video call session). In some aspects, the UE 120 may receive an indication of the periodic interval. In some aspects, the UE 120 may identify the periodic interval based on a setting of the UE 120 (for example, a network operator setting).

As shown by reference number 625, the UE 120 may select a modification to the periodic interval. For example, the UE 120 may modify a periodic interval of the communication (such as the RTCP communication) to avoid a collision associated with the time domain division pattern. In some aspects, the UE 120 may modify the periodic interval by a value to obtain the modified periodic interval. In some aspects, the value may be a prime number. For example, the UE 120 may select the value from a range of values. In some aspects, the UE 120 may randomly select the value (for example, from the range of values). For example, the UE 120 may randomly select a prime number for the range of values. The UE 120 may use the randomly selected prime number to modify the periodic interval for the communication.

In some aspects, the range of values is associated with a periodic interval for a time domain division pattern. For example, the range of values may be from 1 millisecond to X milliseconds (the X milliseconds associated with the time domain division pattern). The UE 120 may modify the periodic interval of the communication (such as the RTCP communication) by the selected value. For example, if the periodic interval of the communication is 1 second and the randomly selected value is 13 milliseconds, the modified periodic interval of the communication may be 1.013 seconds. As another example, if the periodic interval of the communication is 1 second and the randomly selected value is 23 milliseconds, the modified periodic interval of the communication may be 1.023 seconds. Although examples herein may be described as adding the value to the periodic interval, other modifications of the periodic interval are possible. For example, the UE 120 may modify the periodic interval by subtracting the value from the value of the periodic interval. The UE 120 may modify the periodic interval by performing another operation, such that the modified periodic interval is randomized for a generated communication (for example, for an RTCP communication), as described in more detail herein.

As shown by reference number 630, the UE 120 may generate a signal for the communication (for example, for the RTCP communication) at a time associated with the modified periodic interval. For example, the UE 120 may generate the signal for the communication to enable the UE 120 to transmit the communication an amount of time from a previous communication (for example, a previous RTCP communication) that is based on the modified periodic interval. For example, if the modified periodic interval is 1.023 seconds, the UE 120 may generate the signal for the communication to enable the UE 120 to transmit the communication 1.023 seconds after a previous transmission of a communication (for example, a previous RTCP communication).

As used herein, "generating a communication" or "generating a signal for a communication" may refer to generating, creating, or selecting a packet for a communication using one or more protocol layers of the UE 120. For example, the UE 120 may include a user plane protocol stack for communications with the base station 110. On the user plane, the UE 120 and the BS 110 may include respective physical (PHY) layers, medium access control (MAC) layers, radio link control (RLC) layers, packet data convergence protocol (PDCP) layers, and service data adaptation protocol (SDAP) layers.

A user plane function may handle transport of user data between the UE 120 and the BS 110. On the control plane, the UE 120 and the base station 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE 120 and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer may be higher than the SDAP/PDCP/RLC/MAC layer. In some cases, an entity may handle the services and functions of a given layer (for example, a PDCP entity may handle the services and functions of the PDCP layer), though the description herein refers to the layers themselves as handling the services and functions.

The RRC layer may handle communications related to configuring and operating the UE 120. The RRC layer may be referred to as Layer 3 (L3). The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (for example, if the UE 120 is transmitting an uplink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. In some aspects, the RRC/NAS layer may generate control information to be transmitted and may map the control information to one or more radio bearers for provision to the PDCP layer. The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers.

The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is needed), PDCP protocol data unit (PDU) routing (in case of split bearers), retransmission of PDCP service data units (SDUs), ciphering and deciphering, PDCP SDU discard (for example, in accordance with a timer, as described elsewhere herein), PDCP re-establishment and data recovery for RLC-AM, and duplication of PDCP PDUs. The PDCP layer may provide data, in the form of PDCP PDUs, to the RLC layer via RLC channels. The RLC layer may handle transfer of upper layer PDUs to the MAC or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer may be referred to as Layer 1 (L1).

Therefore, as used herein, "generating a communication" or "generating a signal for a communication" may refer to one or more (or all) of the operations described herein in connection with the entities described above (for example, an application layer, an RRC layer, an SDAP layer, a PDCP layer, an RLC layer, a MAC layer, or a PHY layer, among other examples). For example, "generating a communication" may refer to passing data between the different layers of the UE 120 to form a packet for a communication.

Therefore, the UE 120 may generate a signal for a communication or may generate a packet for a communication (for example, an RTCP communication associated with a periodic interval) at a time associated with the modified periodic interval. As shown by reference number 635, the UE 120 (for example, using the first subscription 605) may transmit, and the base station 110 may receive, the communication at the time associated with the modified periodic interval. For example, if the modified periodic interval is 1.023 seconds, the UE 120 may transmit the communication 1.023 seconds after a previous transmission of a communication (for example, after a previous RTCP communication).

As another example, the UE 120 may identify a different modification to the periodic interval for a different communication that is associated with the periodic interval. For example, for a next RTCP communication, the UE 120 may identify or determine a different value to modify the periodic interval by. For example, the UE 120 may randomly select the different value (for example, from the range of values). The UE 120 may modify the periodic interval by the different value to obtain the different modified periodic interval. For example, the modified periodic interval may be 1.023 seconds (as described in connection with reference number 625). The different modified periodic interval may be a different value, such as 1.013 seconds or 1.031 seconds, among other examples. Alternatively, the modified periodic interval and the different modified periodic interval may be the same value (for example, if the same value is randomly selected by the UE 120 to modify the periodic interval for both communications). The UE 120 may generate a signal for the different communication to enable the communication to be transmitted at a time associated with the different modified periodic interval, in a similar manner as described above in connection with reference number 630. The UE 120 may transmit the signal for the different communication at the time associated with the different modified periodic interval, in a similar manner as described above in connection with reference number 635.

By modifying the periodic interval of the communication by a random value, the UE 120 may reduce a likelihood that the communication is generated (or transmitted) in a time window associated with a deprioritization of the traffic for the subscription (for example, in accordance with the time domain division pattern associated with the transmit sharing mode). In other words, modifying the periodic interval of the communication (for example, the RTCP communication) may result in a randomized transmission time within the window associated with the time domain division pattern (for example, within the window of X milliseconds). Modifying the periodic interval of the communication by a random value may reduce a likelihood that the communication is generated during a low priority time window (for example, for a subscription associated with an active voice call or an active video call). Similarly, modifying the periodic interval of the communication by a random value may reduce a likelihood that the communication is generated during a high priority time window of the other subscription (for example, for a subscription associated with an idle or on hold voice call or an idle or on hold video call). Reducing the likelihood that the communication is generated (or transmitted) in a time window associated with a deprioritization of the traffic for the subscription may increase a likelihood that the UE 120 is enabled to transmit the communication in accordance with the time domain division pattern. This improves communication performance of the UE 120 by increasing the likelihood that the UE 120 is enabled to transmit the communication (for example, the RTCP communication) that would have otherwise been lost (not transmitted and not retransmitted).

Figure 7A:
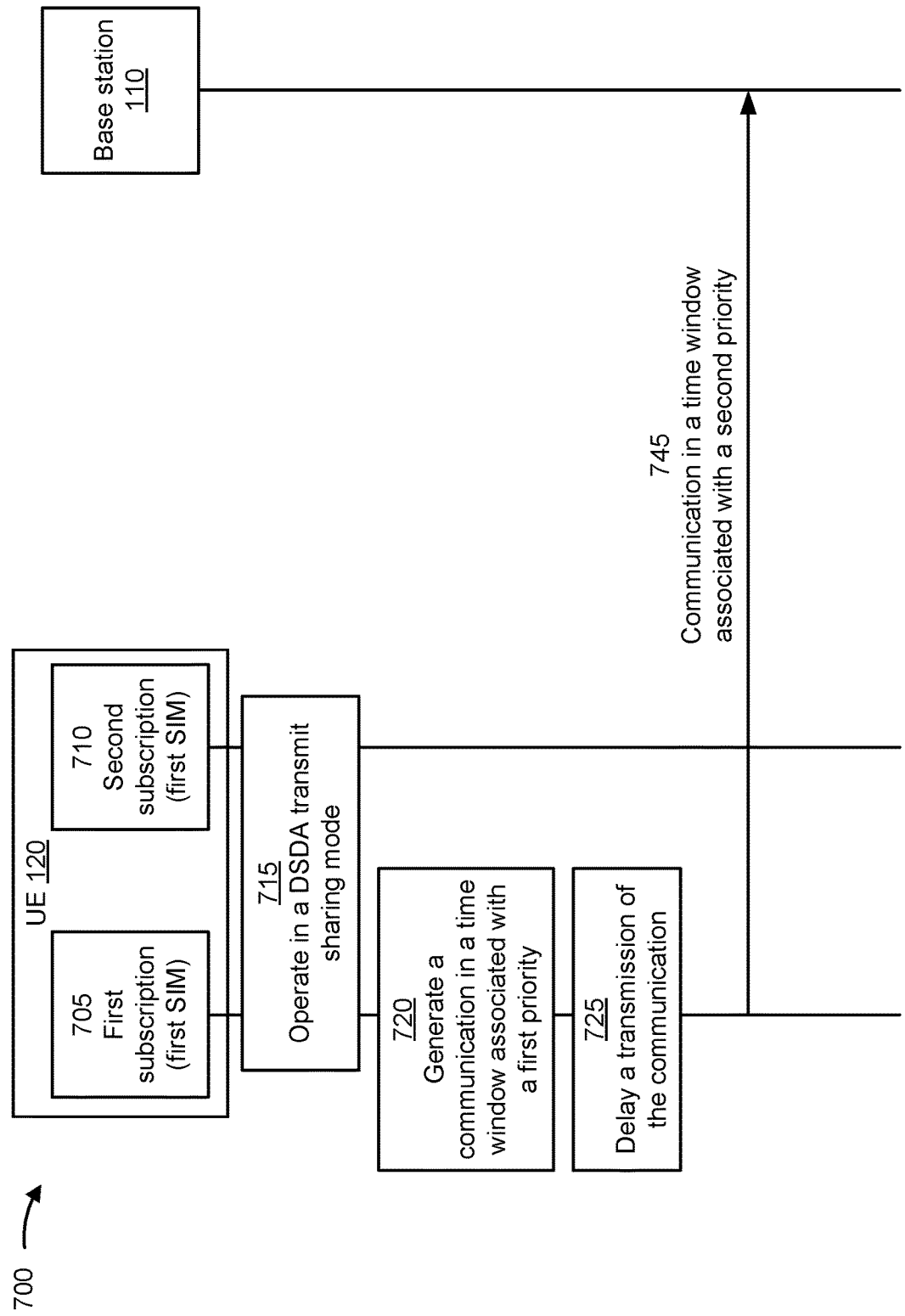
FIGS. 7A-7D are diagrams illustrating examples of collision mitigation for a DSDA mode.

FIGS. 7A-7D are diagrams illustrating examples 700 of collision mitigation for a DSDA mode. As shown in FIG. 7A, a UE 120 (such as the UE 120 depicted in, and described in connection with, FIGS. 1-6) may be a multi-SIM UE (such as the multi-SIM UE depicted in, and described in connection with, FIGS. 3-6). For example, the UE 120 may include a first subscription 705 (for example, associated with a first SIM of the UE 120) and a second subscription 710 (for example, associated with a second SIM of the UE 120). The UE 120 may communicate with a base station 110 (such as the base station 110 depicted in, and described in connection with, FIGS. 1, 2, and 6) using a wireless network, such as the wireless network 100. Although a single base station 110 is depicted in FIG. 7A, the UE 120 may communicate with multiple base stations 110 (for example, one base station 110 for each subscription).

As shown by reference number 715, the UE 120 may be configured to operate in a DSDA mode and in a transmit sharing mode. For example, the UE 120 may be capable of concurrent active communication using both subscriptions (both SIMs) of the UE 120. However, the UE 120 may be associated with one or more limitations that inhibit (or prevent) concurrent transmission of communications using both subscriptions (both SIMS) (for example, associated with a transmit sharing mode as described herein). Therefore, the UE 120 may determine (or receive an indication of) a time domain division pattern associated with sharing time domain resources between the first subscription 705 and the second subscription 710 in the DSDA mode. For example, the UE 120 may determine (or receive an indication of) a time domain division pattern in a similar manner as described in connection with FIGS. 4, 5, and 6.

In some aspects, the time domain division pattern may be associated with a periodicity of high priority time windows for a subscription (for example, for a subscription associated with an active voice call session or an active video call session). For example, an active voice call session or active video call session may be associated with periodic traffic (for example, a voice call packet or a video call packet) that occurs every X milliseconds (such as every 40 milliseconds). Therefore, the time domain division pattern may be configured such that high priority time windows occur every X milliseconds to enable the UE 120 to transmit the traffic associated with the subscription (for example, during a high priority time window, as described herein).

In some aspects, the first subscription 705 may be associated with a voice call or a video call (for example, an active call, or an idle or on hold call). In some aspects, the voice call or the video call may be an active voice call or an active video call (for example, as depicted in, and described in connection with, FIG. 7B). In some other aspects, the first subscription 705 may be associated with an idle or an on hold call (voice call or video call) and the second subscription may be associated with an active voice call or an active video call (for example, as depicted in, and described in connection with, FIG. 7C).

In some aspects, the UE 120 may have a communication to transmit for the first subscription 705 (or the second subscription 710) during a time window associated with a deprioritization of traffic for the first subscription 705 in accordance with the time domain division pattern. For example, if the first subscription 705 is associated with an active call (for example, an active voice call or an active video call), the UE 120 may have (for example, may generate or detect a packet ready for transmission) a communication to transmit for the first subscription 705 in a low priority time window associated with the time domain division pattern (for example, a time window in which communications for the second subscription 710 are prioritized). As another example, if the first subscription 705 is associated with an idle or an on hold call and the second subscription 710 is associated with an active call, the UE 120 may have (for example, may generate or detect a packet ready for transmission) a communication to transmit for the first subscription 705 in a high priority window associated with the time domain division pattern (for example, a time window in which communications for the second subscription 710 are prioritized).

For example, the UE 120 may identify, detect, or generate an RTCP communication, an RTT communication, or an SIP communication, among other examples, for the first subscription 705 during a time window associated with a deprioritization of traffic for the first subscription 705 in accordance with the time domain division pattern. As described in more detail herein, to avoid a collision associated with the time domain division pattern (and traffic associated with the second subscription 710), the UE 120 may align a transmission timeline for the communication (for example, the RTCP communication, the RTT communication, or the SIP communication) with the timeline of the time domain division pattern (such that the communication is transmitted in a time window in which traffic for the first subscription 705 is prioritized).

For example, as shown by reference number 720, the UE 120 may generate a communication (for example, generate a signal, or generate a packet, for the communication) in a time window associated with a first priority for the time domain division pattern. As described herein, the first priority may be associated with a lower priority than a second priority of the time domain division pattern for traffic of the first subscription 705. For example, if the first subscription 705 is associated with an active call, the first priority may be associated with a low priority window for the time domain division pattern (and the first subscription 705). As another example, if the first subscription 705 is associated with an idle or on hold call, the first priority may be associated with a high priority window for the time domain division pattern (and the second subscription 710 that is associated with an active call).

For example, as described herein, during a call session, the UE 120 may periodically generate RTCP communication to transmit control information or session information associated with the call session. An RTCP communication may be generated for the first subscription 705 in a time window associated with the first priority for the time domain division pattern. As another example, an RTT communication may be generated dynamically (for example, based on an input). Therefore, an RTT communication may be generated for the first subscription 705 in a time window associated with the first priority for the time domain division pattern. As another example, an SIP communication may be generated dynamically at any time (for example, for IMS registration or call control). Therefore, an SIP communication may be generated for the first subscription 705 in a time window associated with the first priority for the time domain division pattern. Other communications may be periodically or dynamically generated by the UE 120 for the first subscription in a time window associated with the first priority for the time domain division pattern and operations described herein also may apply to those communications.

In some aspects, the UE 120 may select, for the communication, a time window associated with the first priority for the time domain division pattern. For example, the UE 120 may select the time window associated with the first priority based on an arrival time of the communication at the UE 120. In other words, the UE 120 may detect or obtain information for the communication. The UE 120 may select the time window associated with the first priority based on generating, detecting, or obtaining the information for the communication. For example, the UE 120 (such as a processing system of the UE 120) may receive or generate information for the communication during the time window associated with the first priority. Therefore, the UE 120 may select the time window associated with the first priority. As described in more detail herein, the UE 120 may refrain from transmitting the communication in the time window associated with the first priority to mitigate a collision associated with the time domain division pattern. The UE 120 may transmit the communication in a second time window that is associated with a second priority, as described in more detail herein.

Figure 7B:
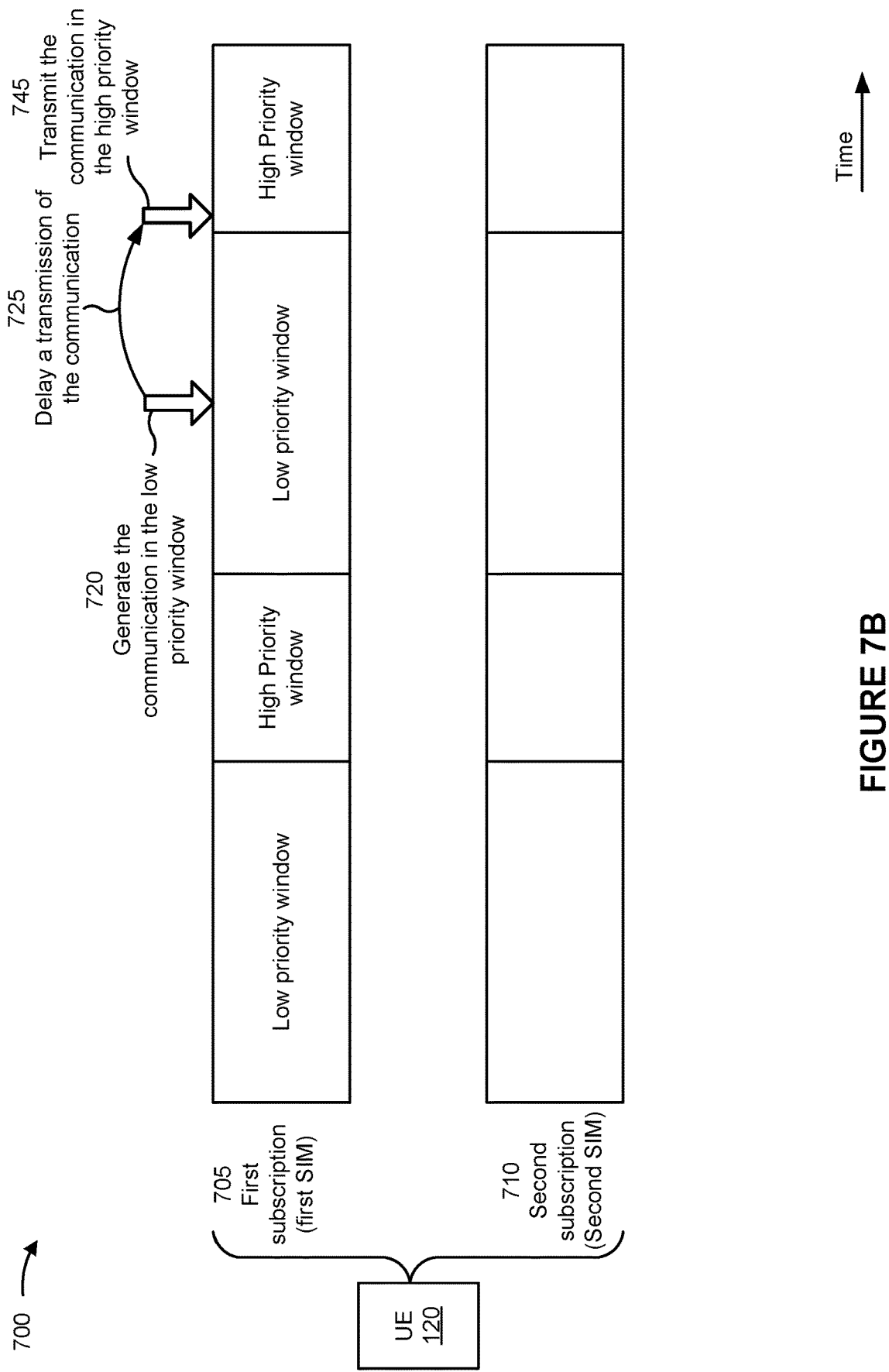

For example, as shown in FIG. 7B, the first subscription 705 may be associated with an active call session. Therefore, the time domain division pattern may indicate low priority windows and high priority windows for traffic associated with the first subscription 705. As shown by reference number 720 in FIG. 7B, the UE 120 may generate a communication for the first subscription 705 in a low priority time window associated with the time domain division pattern. Therefore, the UE 120 may perform one or more actions (as described in more detail herein) to avoid a collision with traffic associated with the second subscription 710 (for example, that is prioritized and may be transmitted during the low priority time window).

Figure 7C:
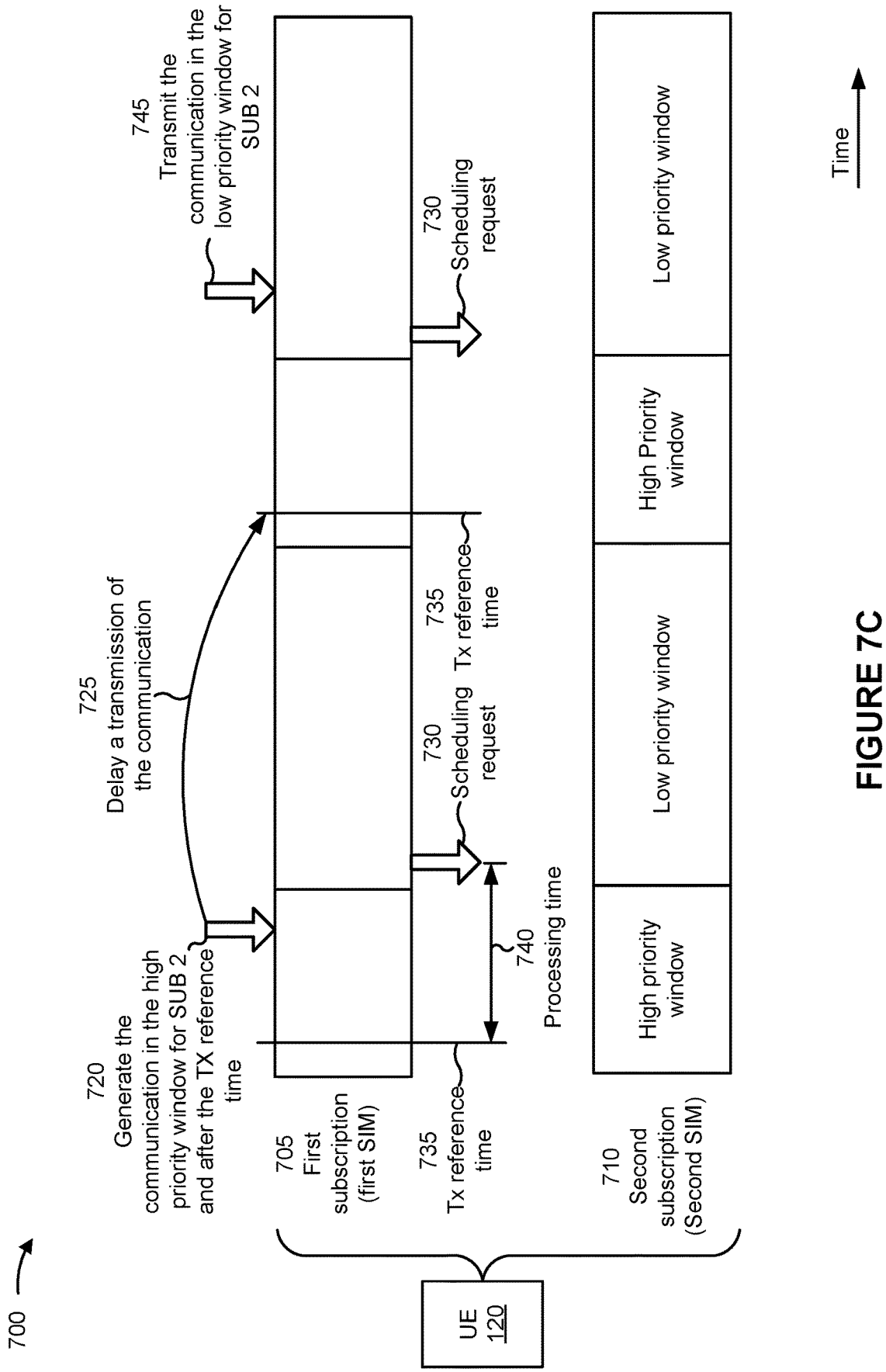

As shown in FIG. 7C, the second subscription 710 may be associated with an active call session. Therefore, the time domain division pattern may indicate low priority windows and high priority windows for traffic associated with the second subscription 710. As shown by reference number 720 in FIG. 7C, the UE 120 may generate a communication for the first subscription 705 in a high priority time window associated with the time domain division pattern. Therefore, the UE 120 may perform one or more actions (as described in more detail herein) to avoid a collision with traffic associated with the second subscription 710 (for example, that is prioritized and may be transmitted during the high priority time window).

Figure 7D:
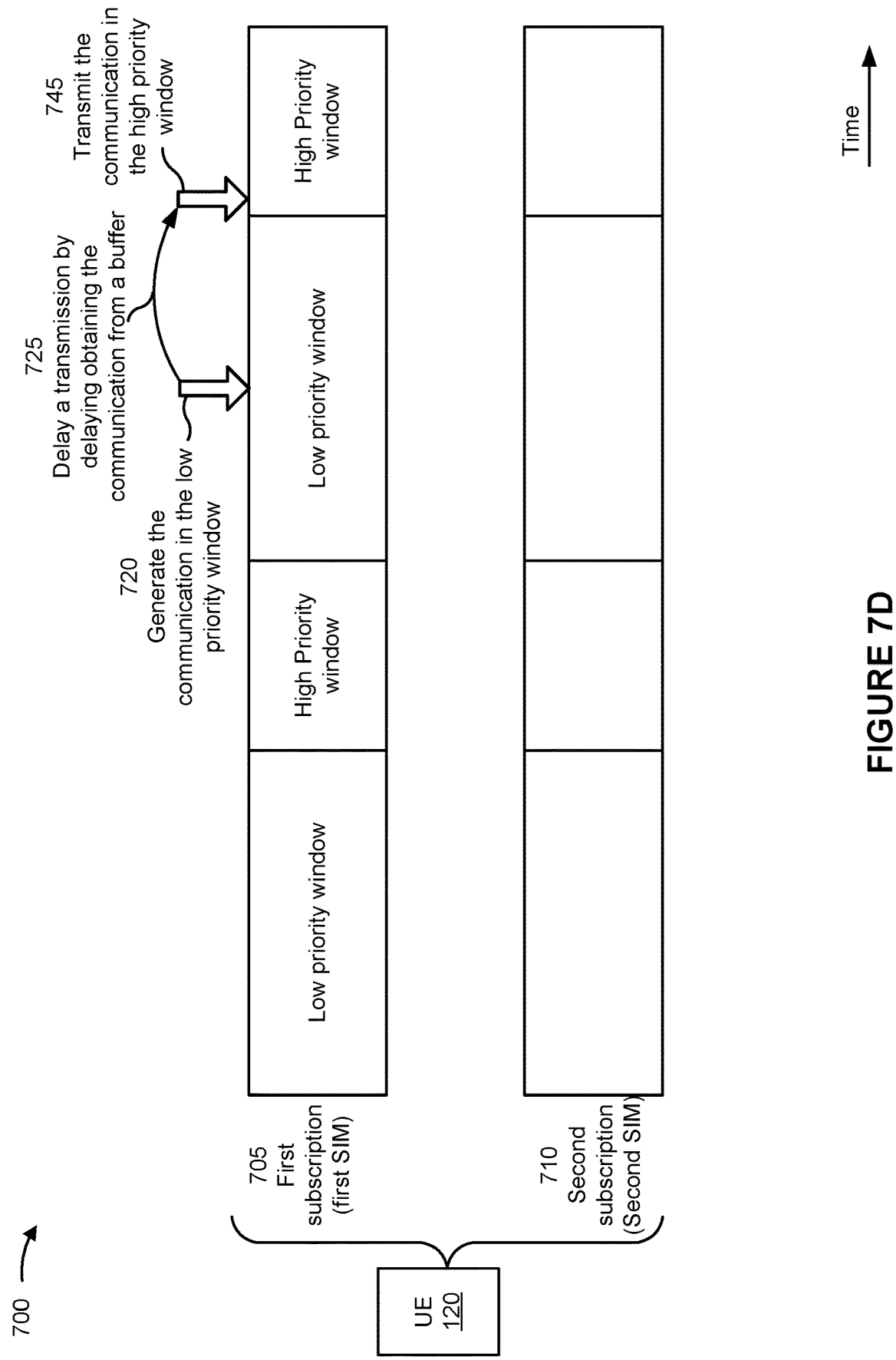

As shown in FIG. 7D, the first subscription 705 may be associated with an active call session. Therefore, the time domain division pattern may indicate low priority windows and high priority windows for traffic associated with the first subscription 705. As shown by reference number 720 in FIG. 7D, the UE 120 may generate a communication for the first subscription 705 in a low priority time window associated with the time domain division pattern. Therefore, the UE 120 may perform one or more actions (as described in more detail herein) to avoid a collision with traffic associated with the second subscription 710 (for example, that is prioritized and may be transmitted during the low priority time window).

Returning to FIG. 7A, and as shown by reference number 725, the UE 120 may delay the communication (for example, delay a transmission of the communication) until after the time window associated with the first priority for the time domain division pattern. In other words, the UE 120 may delay a transmission of the communication until a time window associated with a second priority for the time domain division pattern (for example, a time window in which communications for the first subscription 705 are prioritized in accordance with the time domain division pattern). For example, if the first subscription 705 is associated with an active voice or video call, the UE 120 may delay the transmission of the communication until after a low priority time window for the time domain division pattern associated with an active voice or an active video call (for example, as depicted in, and described in connection with, FIG. 7B). Alternatively, if the first subscription 705 is not associated with an active voice or video call (for example, is associated with an idle or on hold call) and the second subscription 710 is associated with an active voice or video call, the UE 120 may delay the transmission of the communication until after a high priority time window for the time domain division pattern associated with the active voice or the active video call for the second subscription 710 (for example, as depicted in, and described in connection with, FIG. 7C).

In some aspects, "delaying a transmission of the communication" may refer to an upper layer of the UE 120 (for example, an application layer of the UE 120) refraining from passing information for the communication to lower layers of the UE 120 (for example, the PHY layer) until a time window in which traffic for the first subscription is prioritized in accordance with the time domain division pattern (for example, as depicted in, and described in connection with, FIGS. 7B and 7C). In some other aspects, "delaying a transmission of the communication" may refer to the UE 120 refraining from obtaining (for example, fetching) data for the communication from a buffer of the UE 120 until a time window in which traffic for the first subscription is prioritized in accordance with the time domain division pattern (for example, as depicted in, and described in connection with, FIG. 7D). For example, a lower layer of the UE 120 may refrain from obtaining (for example, fetching) data for the communication from a buffer of the UE 120 until a time window in which traffic for the first subscription is prioritized in accordance with the time domain division pattern, as described in more detail herein.

For example, as shown in FIG. 7B, the UE 120 may delay a transmission of the communication until a time window in which packets for an active call session are enabled to be transmitted for the first subscription 705. In other words, the UE 120 may align a transmission time of the communication with the time domain division pattern, such that the communication is transmitted in a high priority time window for the time domain division pattern and the first subscription 705. For example, as shown by reference number 725 in FIG. 7B, the UE 120 may delay a transmission of the communication (that is generated during the low priority window) until a high priority window (such as a next high priority window) of the time domain division pattern. For example, the application layer of the UE 120 may refrain from passing information (such as data) to lower layers of the UE 120 until a high priority window (such as a next high priority window) of the time domain division pattern. In this way, the UE 120 may align a transmission time of the communication with the time domain division pattern for the active call of the first subscription 705. As a result, the UE 120 may be enabled to transmit the communication (for example, during a high priority window associated with the time domain division pattern), as described in more detail herein.

As shown in FIG. 7C, the first subscription 705 may not be associated with an active call. For example, the first subscription 705 may be associated with an idle call or an on hold call. As shown in FIG. 7C, the second subscription 710 may be associated with an active call. For example, the time domain division pattern may indicate or configure low priority windows and high priority windows for traffic associated with the second subscription 710. The UE 120 may delay a transmission of the communication until a time window in which packets for the non-active (the idle or on hold) call session for the first subscription 705 are enabled to be transmitted for the first subscription 705. For example, the UE 120 may delay a transmission of the communication until a low priority window for traffic associated with the second subscription 710. The UE 120 may delay the transmission of the communication until a low priority window for traffic associated with the second subscription 710 by selecting a scheduling request for the communication that occurs in a low priority window (as indicated by the time domain division pattern).

For example, as the first subscription 705 may be associated with a non-active call session, the UE 120 may transmit a scheduling request to enable the UE 120 to transmit uplink communications for the first subscription 705. For example, the UE 120 may transmit a scheduling request to the base station 110 that requests a grant (for example, an uplink grant) for the communication. In some aspects, the base station 110 may configure one or more scheduling requests for the UE 120. For example, the base station 110 may configure scheduling requests (such as transmission opportunities for scheduling requests) to occur periodically, such as every 10 milliseconds. The UE 120 may select a scheduling request for a communication based on a next available scheduling request configured by the base station 110. However, to ensure that the communication is transmitted in a low priority window associated with the second subscription 710, the UE 120 may align a transmission time of the communication such that a scheduling request that occurs in a low priority time window (for example, that is aligned with the low priority time window) associated with the second subscription 710 is selected for the communication.

For example, the UE 120 may identify a scheduling request 730 that occurs in a low priority window associated with the second subscription 710. As shown in FIG. 7C, the scheduling request 730 may be periodic such that the scheduling request 730 is available during multiple (for example, all) low priority windows associated with the time domain division pattern and the second subscription 710. The UE 120 may ensure that the scheduling request 730 is selected for the communication by identifying a transmit (Tx) reference time 735 for the communication. The transmit reference time may be based on a timing of the scheduling request 730 and a processing time 740. The processing time 740 may be an amount of time associated with processing (for example, generating) the communication (for example, generating a packet for the communication). For example, to generate the communication, information for the communication may be passed between different layers of the UE 120. In some aspects, such as for an RTCP communication, information (or data) for the communication may be passed from an application layer, to a PDCP layer, to an RLC layer, to a MAC layer, and to a PHY layer (for example, as described in more detail herein). The processing time 740 may be the time associated with passing information between the different layers of the UE 120. Once the information (for example, a packet) is passed to the PHY layer, the UE 120 may select a scheduling request for the communication. Therefore, by configuring the transmit reference time 735 based on the timing of the scheduling request 730 and the processing time 740, the UE 120 may ensure that a communication that is generated (for example, in the application layer) at the transmit reference time 735 will use the scheduling request 730 that occurs in the low priority window.

As shown in FIG. 7C, the transmit reference time 735 may be configured to repeat (for example, periodically based on the periodicity of the time domain division pattern). For example, the UE 120 may configure the transmit reference time 735 to occur every X milliseconds, where X milliseconds is the periodicity of the time domain division pattern, as described in more detail herein. Therefore, when a communication is generated by the UE 120 (for example, in the application layer) after a transmit reference time 735 (as shown in FIG. 7C and by reference number 720), the UE 120 may delay a transmission of the communication until a next transmit reference time 735.

For example, as shown by reference number 725 in FIG. 7C, the UE 120 may delay a transmission of the communication until a next transmit reference time 735. In other words, the application layer of the UE 120 may refrain from passing information associated with the communication to lower layers until the next transmit reference time 735. This enables the UE 120 to ensure that the scheduling request 730 that occurs in the low priority window (for traffic of the second subscription 710) is selected for the communication. For example, as shown in FIG. 7C, the UE 120 may generate the communication (for example, pass information from the application layer to lower layers) at the next transmit reference time 735. As a result, the UE 120 may select and transmit the scheduling request 730 that occurs in the low priority window (for traffic of the second subscription 710). Therefore, the UE 120 is enabled to transit the communication in the low priority window (for traffic of the second subscription 710) based on transmitting the scheduling request 730 for the communication that also occurs in the low priority window.

As shown in FIG. 7D, the UE 120 may delay a transmission of the communication by delaying a time associated with obtaining (for example, fetching) data for the communication from a buffer of the UE 120. For example, as described elsewhere herein, as depicted in FIG. 7D, the first subscription 705 may be associated with an active call and a time domain division pattern. As shown in FIG. 7D (and by reference number 720), the communication may be generated (for example, passed through the layers of the UE 120) in a low priority time window (for example, a time window in which communications for the first subscription 705 are deprioritized). Therefore, the UE 120 may refrain (for example, by a lower layer, such as the PHY layer) from obtaining the communication (for example, from obtaining data for the communication) from a buffer in a time window associated with a low priority (the low priority window) for the time domain division pattern.

As shown by reference number 725 in FIG. 7D, the UE 120 may delay a transmission of the communication by obtaining the communication (for example, obtaining data for the communication) from a buffer after the time window associated with the first priority (low priority window, as depicted in FIG. 7D) for the time domain division pattern. In other words, the UE 120 may obtain the communication (for example, obtain data for the communication) from the buffer in a time window associated with a high priority (high priority window, as depicted in FIG. 7D) for the time domain division pattern. In this way, the UE 120 may ensure that the communication is transmitted in the high priority window, thereby enabling the UE 120 to transmit the communication, as described in more detail herein.

In some other aspects, the first subscription 705 may be associated with a non-active call (for example, an idle call or an on hold call). Therefore, the time domain division pattern may be based on an active call associated with the second subscription 710 (in a similar manner as depicted in FIG. 7C). In that case, the UE 120 may delay a transmission of the communication by obtaining the communication (for example, obtaining data for the communication) from a buffer after the time window associated with a high priority window for the time domain division pattern (and the second subscription 710). In other words, the UE 120 may only obtain data for the communication in a low priority window for the time domain division pattern (and the second subscription 710). This may enable the UE 120 to transmit communications for the non-active call (for example, an idle call or an on hold call) during the low priority window for the active call (for example, for the second subscription 710).

Therefore, when the first subscription 705 is associated with an active call, the UE 120 may obtain data for communications (for example, for RTCP communications, RTT communications, or SIP communications, among other examples) only in high priority windows for the first subscription 705 (for example, as indicated by the time domain division pattern). In low priority windows, the UE 120 may only obtain data from a buffer for packet switched data. In other words, in low priority windows, the UE 120 may serve only packet switched data. In high priority windows, the UE 120 may serve all radio bearers.

Alternatively, when the first subscription 705 is associated with a non-active call (and the second subscription 710 is associated with an active call), the UE 120 may obtain data for communications (for example, for RTCP communications, RTT communications, or SIP communications, among other examples) only in low priority windows for the second subscription 710 (for example, as indicated by the time domain division pattern). In high priority windows for the second subscription 710, the UE 120 may only obtain data from a buffer for packet switched data. This enables the UE 120 to ensure that communications (for example, for RTCP communications, RTT communications, or SIP communications, among other examples) are enabled to be transmitted using the first subscription 705 in a time window in which traffic for the first subscription 705 is prioritized in accordance with the time domain division pattern (for example, over traffic for the second subscription 710), as described in more detail herein.

Returning to FIG. 7A, as shown by reference number 745, the UE 120 may transmit, using the first subscription 705, the communication in a time window associated with a second priority for the time domain division pattern. As described elsewhere herein, the second priority may be associated with a high priority window if the first subscription 705 is associated with an active call. Alternatively, the second priority may be associated with a low priority window for an active call of the second subscription 710 if the first subscription 705 is associated with a non-active call. In other words, the UE 120 may transmit the communication in a time window that is associated with a different priority for traffic of the first subscription 705 than a time window in which the communication was generated (for example, by one or more layers of the UE 120). For example, the UE 120 may transmit the communication in the time window associated with the second priority for the time domain division pattern by delaying a transmission of the communication until the time window associated with the second priority. As a result, the UE 120 may be enabled to transmit traffic that would have otherwise been dropped and lost (for example, RTCP communications or RTT communication) or that would have otherwise been delayed (for example, SIP communications) based on being generated in a time window in which traffic for the first subscription 705 is deprioritized (for example, in accordance with the time domain division pattern).

For example, as shown in FIG. 7B, the UE 120 may transmit the communication in a high priority window associated with the first subscription 705 and the time domain division pattern (as shown by reference number 745 in FIG. 7B). For example, the UE 120 may delay (such as in the application layer) the communication until the high priority window. As a result, the UE 120 may be enabled to transmit the communication in the high priority window, as described elsewhere herein.

As shown in FIG. 7C, the UE 120 may transmit, using the first subscription 705, the communication in a low priority window associated with the second subscription 710 (as shown by reference number 745 in FIG. 7C). For example, by the UE 120 may select and transmit the scheduling request 730 that occurs in the low priority window. For example, the UE 120 may select the scheduling request 730 based on delaying the communication (for example, by the application layer) until the transmit reference time 735, as described in more detail elsewhere herein. The UE 120 may receive, from the base station 110, an uplink grant for the communication that occurs in the low priority window based on transmitting the scheduling request 730. The UE 120 may transmit, to the base station 110, the communication in the low priority window (for example, using the uplink grant). As a result, the UE 120 may be enabled to transmit, using the first subscription 705, the communication in the low priority window for the second subscription 710, as described elsewhere herein.

As shown in FIG. 7D, the UE 120 may transmit the communication in a high priority window associated with the first subscription 705 and the time domain division pattern (as shown by reference number 745 in FIG. 7D). For example, the UE 120 may delay (such as by a lower layer) obtaining data from a buffer for the communication until the high priority window. As a result, the UE 120 may be enabled to transmit the communication in the high priority window, as described elsewhere herein. Alternatively, if the first subscription 705 is associated with a non-active call, the UE 120 may delay (such as by a lower layer) obtaining data from a buffer for the communication until a low priority window for an active call (such as for the second subscription 710). The UE 120 may transmit the communication in a low priority window associated with the second subscription 710 based on obtaining the data from the buffer for the communication in the low priority window.

Therefore, the UE 120 may be enabled to transmit communications (for example, RTCP communications, RTT communications, or SIP communications, among other examples) that would have otherwise been lost, dropped, or delayed. For example, the UE 120 may be enabled to transmit a communication, for the first subscription 705, in a time window in which traffic for the first subscription is prioritized (over traffic for the second subscription 710) in accordance with the time domain division pattern associated with the transmit sharing mode.

Figure 8:
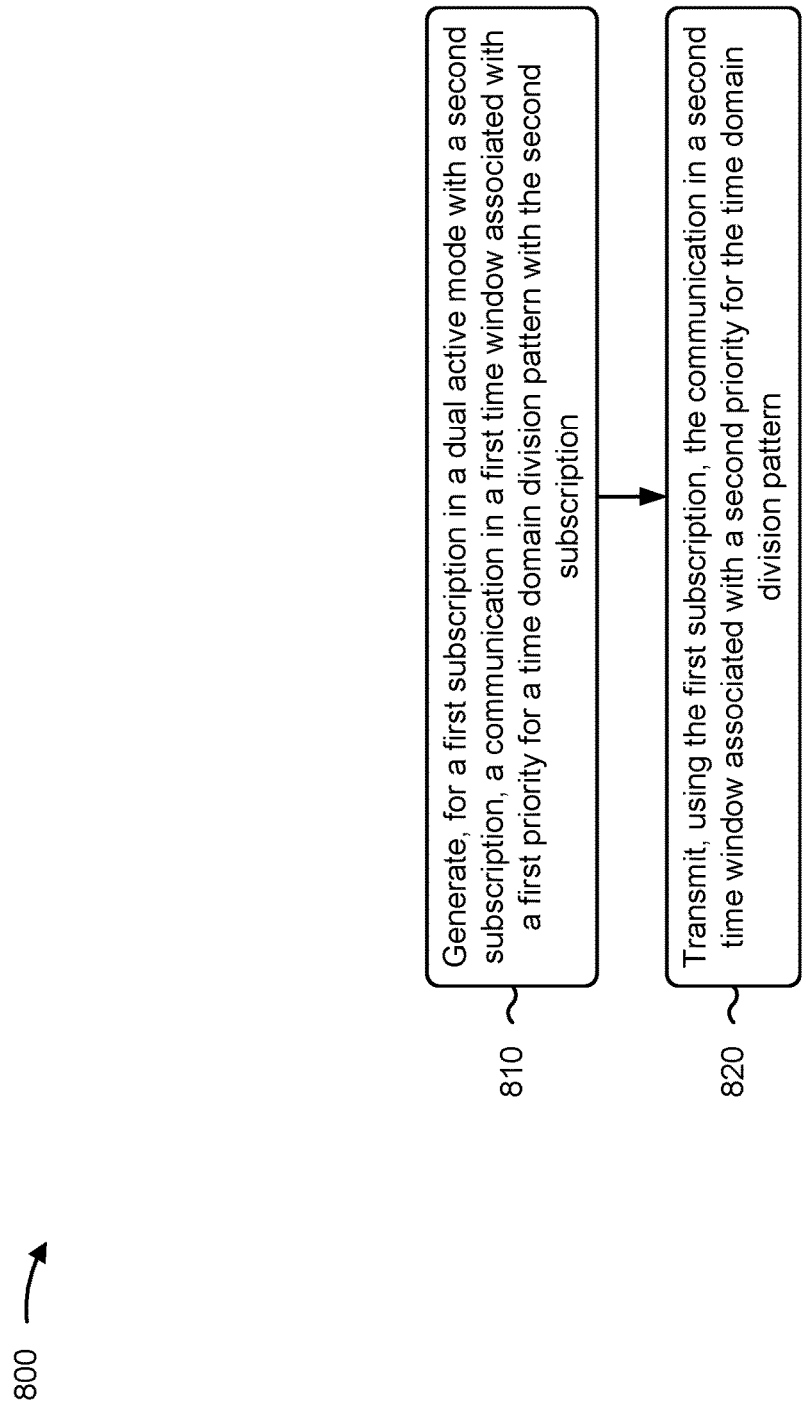
FIGS. 8 and 9 are diagrams illustrating example processes performed, for example, by a UE.

FIG. 8 is a diagram illustrating an example process 800 performed, for example, by a UE. The process 800 is an example where the UE (for example, the UE 120 depicted in, and described in connection with FIG. 1, 2, 3, 4, 5, 6, 7A, 7B, 7C, 7D, 12A, or 12B) performs operations associated with collision mitigation for a DSDA UE.

As shown in FIG. 8, in some aspects, the process 800 may include generating, for a first subscription in a dual active mode with a second subscription, a communication in a first time window associated with a first priority for a time domain division pattern with the second subscription (block 810). For example, the user equipment (such as by using communication generation component 1008, depicted in FIG. 10) may generate, for a first subscription in a dual active mode with a second subscription, a communication in a first time window associated with a first priority for a time domain division pattern with the second subscription, as described herein.

As further shown in FIG. 8, in some aspects, the process 800 may include transmitting, using the first subscription, the communication in a second time window associated with a second priority for the time domain division pattern (block 820). For example, the user equipment (such as by using transmission component 1004, depicted in FIG. 10) may transmit, using the first subscription, the communication in a second time window associated with a second priority for the time domain division pattern, as described herein.

The process 800 may include additional aspects, such as any single aspect or any combination of aspects described below or in connection with one or more other processes described elsewhere herein.

In a first additional aspect, the first priority is associated with a lower priority than the second priority for traffic of the first subscription.

In a second additional aspect, alone or in combination with the first aspect, the first subscription is associated with an active voice or video call, and transmitting the communication includes delaying the communication until after the first time window associated with the first priority for the time domain division pattern associated with the active voice or video call, and transmitting the communication after the first time window associated with the first priority.

In a third additional aspect, alone or in combination with one or more of the first and second aspects, the first subscription is associated with an active voice or video call, and the first priority is associated with a low priority time window for the time domain division pattern associated with the active voice or video call and the second priority is associated with a high priority time window for the time domain division pattern associated with the active voice or video call, and transmitting the communication includes delaying the communication until after the low priority time window for the time domain division pattern associated with the active voice or video call, and transmitting the communication during the high priority time window for the time domain division pattern associated with the active voice or video call.

In a fourth additional aspect, alone or in combination with one or more of the first through third aspects, the first subscription is not associated with an active voice or video call and the second subscription is associated with an active voice or video call, and transmitting the communication includes selecting a scheduling request for the communication that is aligned with a low priority time window for traffic associated with the second subscription, transmitting the scheduling request for the communication, and transmitting the communication in the second time window associated with the second priority based on transmitting the scheduling request.

In a fifth additional aspect, alone or in combination with one or more of the first through fourth aspects, selecting the scheduling request includes selecting the scheduling request using a transmit reference time for the communication that is based on a processing time and a timing of the scheduling request.

In a sixth additional aspect, alone or in combination with one or more of the first through fifth aspects, the first subscription is not associated with an active voice or video call and the second subscription is associated with an active voice or video call, the first priority is associated with a high priority time window for the time domain division pattern of the second subscription and the second priority is associated with a low priority time window for the time domain division pattern, and transmitting the communication includes selecting a scheduling request for the communication that is aligned with the low priority time window for the time domain division pattern of the second subscription, transmitting the scheduling request for the communication, and transmitting the communication in the low priority time window for the time domain division pattern of the second subscription.

In a seventh additional aspect, alone or in combination with one or more of the first through sixth aspects, transmitting the communication includes obtaining the communication from a buffer after the first time window associated with the first priority for the time domain division pattern, and transmitting the communication in the second time window associated with the second priority based on obtaining the communication from the buffer after the first time window associated with the first priority.

In an eighth additional aspect, alone or in combination with one or more of the first through seventh aspects, the first subscription is associated with an active voice or video call, and transmitting the communication includes obtaining the communication from a buffer in a time window associated with a high priority for the time domain division pattern associated with the active voice or video call, and transmitting the communication in the second time window associated with the second priority based on obtaining the communication from the buffer in the time window associated with the high priority.

In a ninth additional aspect, alone or in combination with one or more of the first through eighth aspects, the first subscription is not associated with an active voice or video call and the second subscription is associated with an active voice or video call, and transmitting the communication includes obtaining the communication from a buffer in a time window associated with a low priority for the time domain division pattern associated with the active voice or video call, and transmitting the communication in the second time window associated with the second priority based on obtaining the communication from the buffer in the time window associated with the low priority.

In a tenth additional aspect, alone or in combination with one or more of the first through ninth aspects, generating the communication includes delaying, by an application layer of the UE, the communication until after the first time window associated with the first priority, and transmitting the communication includes transmitting the communication in the second time window associated with the second priority based on delaying the communication until after the first time window associated with the first priority.

In an eleventh additional aspect, alone or in combination with one or more of the first through tenth aspects, transmitting the communication includes delaying, by a lower layer of the UE, the communication until after the first time window associated with the first priority, and transmitting the communication in the second time window associated with the second priority based on delaying the communication until after the first time window associated with the first priority.

In a twelfth additional aspect, alone or in combination with one or more of the first through eleventh aspects, the communication is at least one of an RTCP communication, an RTT communication, or an SIP communication.

In a thirteenth additional aspect, alone or in combination with one or more of the first through twelfth aspects, the UE is operating in a transmit sharing mode for the first subscription and the second subscription.

In a fourteenth additional aspect, alone or in combination with one or more of the first through thirteenth aspects, transmitting the communication in the second time window associated with the second priority for the time domain division pattern is based on the second subscription transitioning to a time window associated with the first priority earlier in time than indicated by the time domain division pattern.

In a fifteenth additional aspect, alone or in combination with one or more of the first through fourteenth aspects, process 800 includes transmitting, from the first subscription and to the second subscription, a request to transmit the communication; and receiving, by the first subscription and from the second subscription, a response to the request to transmit the communication indicating whether the response is approved or denied.

In a sixteenth additional aspect, alone or in combination with one or more of the first through fifteenth aspects, transmitting the communication in the second time window associated with the second priority for the time domain division pattern is based on the response indicating that the request is approved.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

Figure 9:
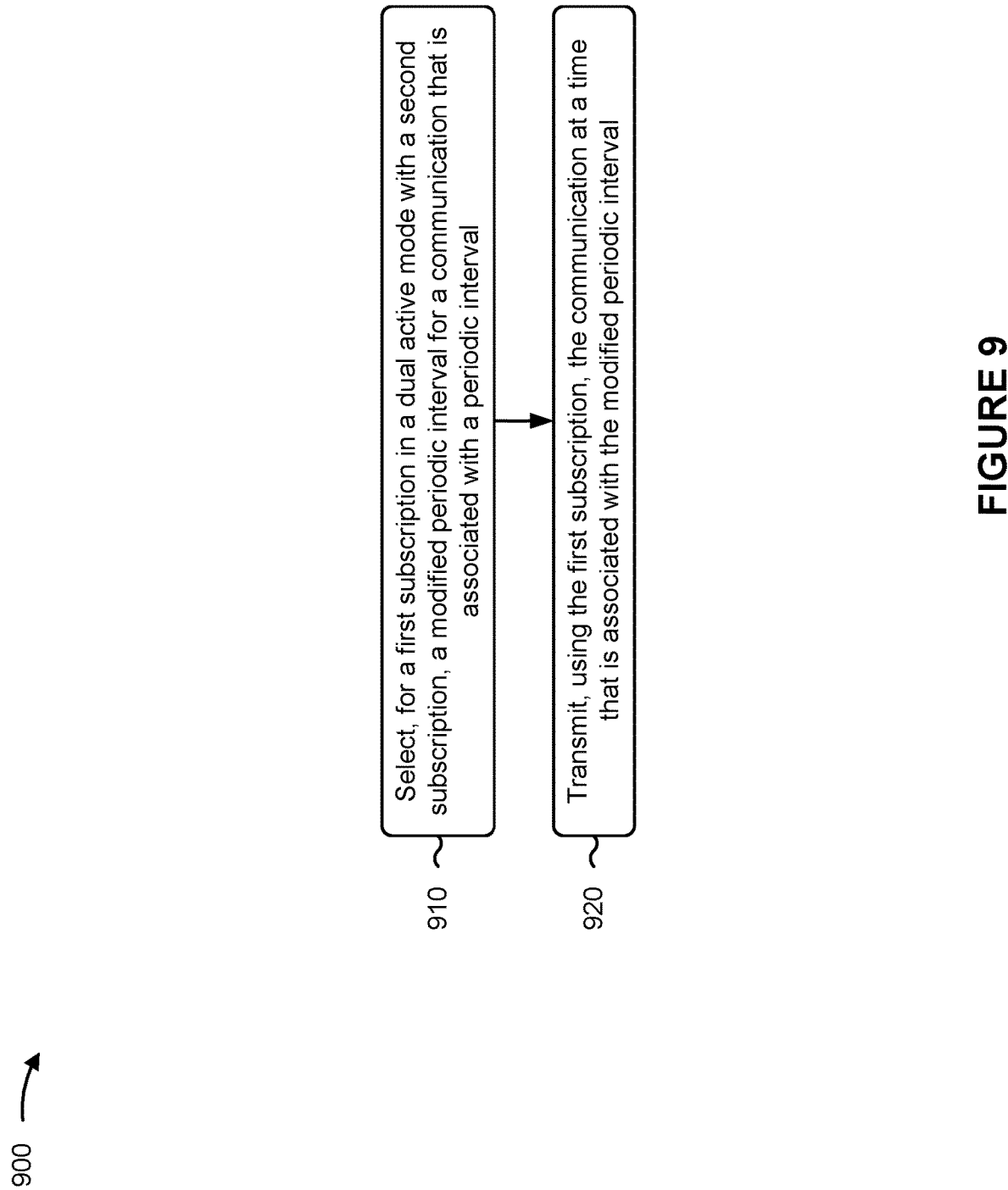

FIG. 9 is a diagram illustrating an example process 900 performed, for example, by a UE. The process 900 is an example where the UE (for example, the UE 120 depicted in, and described in connection with FIG. 1, 2, 3, 4, 5, 6, 7A, 7B, 7C, 7D, 8, 12A, or 12B) performs operations associated with collision mitigation for a DSDA UE.

As shown in FIG. 9, in some aspects, the process 900 may include selecting, for a first subscription in a dual active mode with a second subscription, a modified periodic interval for a communication that is associated with a periodic interval (block 910). For example, the UE (such as by using selection component 1108, depicted in FIG. 11) may select, for a first subscription in a dual active mode with a second subscription, a modified periodic interval for a communication that is associated with a periodic interval, as described herein.

As further shown in FIG. 9, in some aspects, the process 900 may include transmitting, using the first subscription, the communication at a time that is associated with the modified periodic interval (block 920). For example, the UE (such as by using transmission component 1104, depicted in FIG. 11) may transmit, using the first subscription, the communication at a time that is associated with the modified periodic interval, as described herein.

The process 900 may include additional aspects, such as any single aspect or any combination of aspects described below or in connection with one or more other processes described elsewhere herein.

In a first additional aspect, the communication is an RTCP communication.

In a second additional aspect, alone or in combination with the first aspect, selecting the modified periodic interval includes modifying the periodic interval by a value to obtain the modified periodic interval, and generating the communication at the time associated with the modified periodic interval.

In a third additional aspect, alone or in combination with one or more of the first and second aspects, the value is a prime number.

In a fourth additional aspect, alone or in combination with one or more of the first through third aspects, selecting the modified periodic interval includes modifying the periodic interval by a randomly selected value to obtain the modified periodic interval, and generating the communication at the time associated with the modified periodic interval.

In a fifth additional aspect, alone or in combination with one or more of the first through fourth aspects, selecting the modified periodic interval includes selecting a value from a range of values, modifying the periodic interval by the value to obtain the modified periodic interval, and generating the communication at the time associated with the modified periodic interval.

In a sixth additional aspect, alone or in combination with one or more of the first through fifth aspects, the range of values is associated with a periodic interval for a time domain division pattern for the first subscription and the second subscription.

In a seventh additional aspect, alone or in combination with one or more of the first through sixth aspects, the process 900 includes selecting, for the first subscription, a different modified periodic interval for a different communication that is associated with the periodic interval, and transmitting, using the first subscription, the different communication at a time that is associated with the different modified periodic interval.

In an eighth additional aspect, alone or in combination with one or more of the first through seventh aspects, the UE is operating in a transmit sharing mode for the first subscription and the second subscription.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

Figure 10:
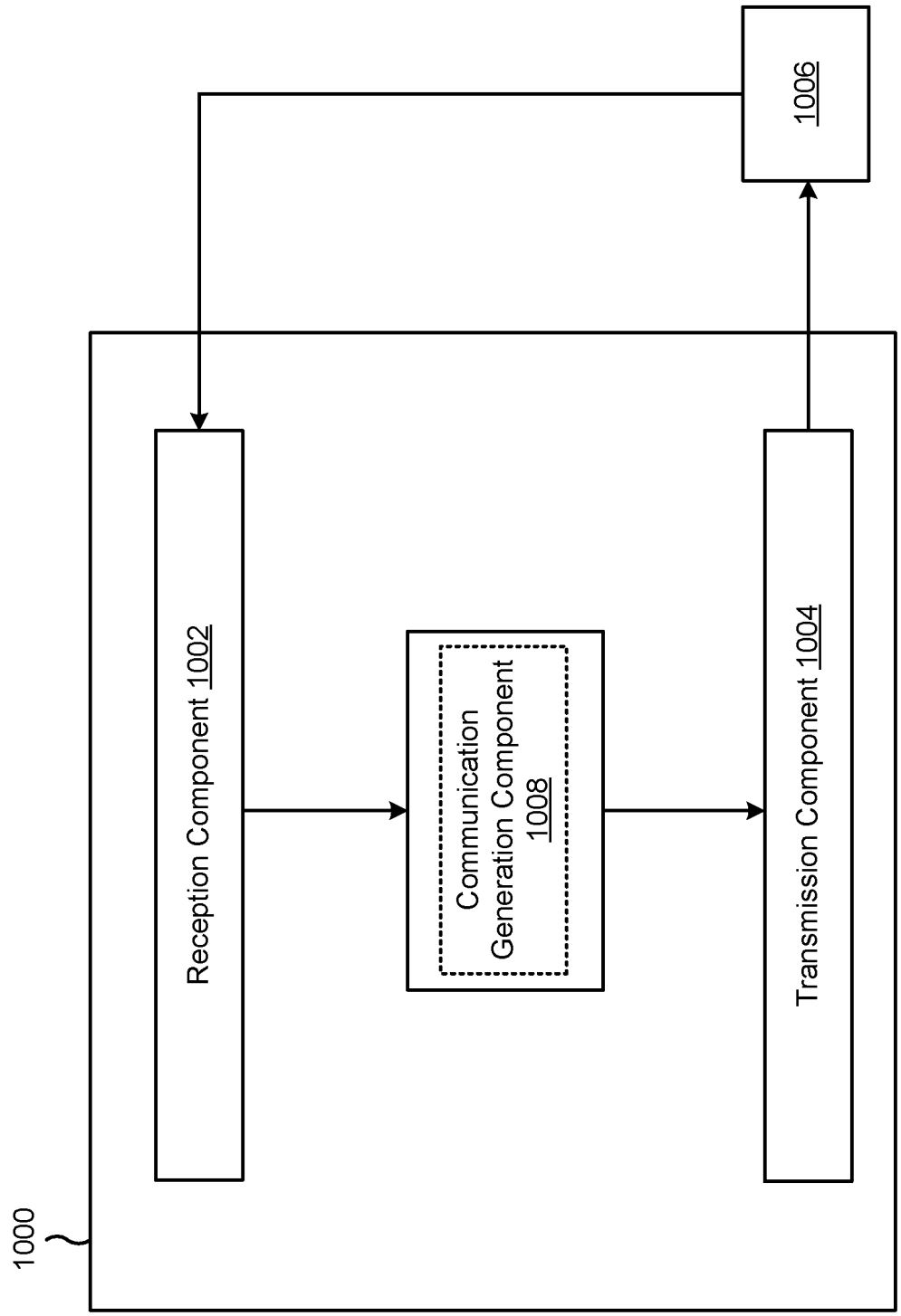
FIGS. 10 and 11 are block diagrams of example apparatuses for wireless communication.

FIG. 10 is a block diagram of an example apparatus 1000 for wireless communication. The apparatus 1000 may be a UE (such as the UE 120 depicted in, and described in connection with, FIG. 1-9 or 12A-12B), or a UE may include the apparatus 1000. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication generation component 1008, among other examples.

In some aspects, the apparatus 1000 may be configured to perform one or more operations described herein in connection with FIGS. 6, 7A, 7B, 7C, 7D, 12A, and 12B. Additionally, or alternatively, the apparatus 1000 may be configured to perform one or more processes described herein, such as process 800 of FIG. 8, or a combination thereof. In some aspects, the apparatus 1000 or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

In some aspects, the reception component 1002 may be a component of a processing system. For example, a "processing system" of the apparatus 1000 may refer to a system including the various other components or subcomponents of the apparatus 1000.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the transmission component 1004 may be a component of a processing system. For example, a "processing system" of the apparatus 1000 may refer to a system including the various other components or subcomponents of the apparatus 1000.

The processing system of the apparatus 1000 may interface with other components of the apparatus 1000, and may process information received from other components (such as inputs or signals), output information to other components, etc. For example, a chip or modem of the apparatus 1000 may include a processing system, the reception component 1002 to receive or obtain information, and the transmission component 1004 to output, transmit or provide information. In some cases, the "reception component" 1002 may refer to an interface between the processing system of the chip or modem and a receiver, such that the apparatus 1000 may receive information or signal inputs, and the information may be passed to the processing system. In some cases, the "transmission component" 1004 may refer to an interface between the processing system of the chip or modem and a transmitter, such that the apparatus 1000 may transmit information output from the chip or modem. A person having ordinary skill in the art will readily recognize that the second interface also may obtain or receive information or signal inputs, and the first interface also may output, transmit or provide information.

The communication generation component 1008 may generate, for a first subscription in a dual active mode with a second subscription, a communication in a first time window associated with a first priority for a time domain division pattern with the second subscription. The transmission component 1004 may transmit, using the first subscription, the communication in a second time window associated with a second priority for the time domain division pattern.

The transmission component 1004 may delay the communication until after the first time window associated with the first priority for the time domain division pattern associated with the active voice or video call. The transmission component 1004 may transmit the communication after the first time window associated with the first priority.

The transmission component 1004 may delay the communication until after the low priority time window for the time domain division pattern associated with the active voice or video call. The transmission component 1004 may transmit the communication during the high priority time window for the time domain division pattern associated with the active voice or video call.

The transmission component 1004 select a scheduling request for the communication that is aligned with a low priority time window for traffic associated with the second subscription. The transmission component 1004 may transmit the scheduling request for the communication. The transmission component 1004 may transmit the communication in the second time window associated with the second priority based on transmitting the scheduling request. The transmission component 1004 may select the scheduling request using a transmit reference time for the communication that is based on a processing time and a timing of the scheduling request.

The transmission component 1004 may obtain the communication from a buffer after the first time window associated with the first priority for the time domain division pattern. The transmission component 1004 may transmit the communication in the second time window associated with the second priority based on obtaining the communication from the buffer after the time window associated with the first priority. The transmission component 1004 may obtain the communication from a buffer in a time window associated with a high priority for the time domain division pattern associated with the active voice or video call. The transmission component 1004 may transmit the communication in the second time window associated with the second priority based on obtaining the communication from the buffer in the time window associated with the high priority.

The transmission component 1004 may obtain the communication from a buffer in a time window associated with a low priority for the time domain division pattern associated with the active voice or video call. The transmission component 1004 may transmit the communication in the second time window associated with the second priority based on obtaining the communication from the buffer in the time window associated with the low priority.

The communication generation component 1008 may delay, by an application layer or a lower layer of the apparatus, the communication until after the first time window associated with the first priority. The transmission component 1004 may transmit the communication in the second time window associated with the second priority based on delaying the communication until after the first time window associated with the first priority.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
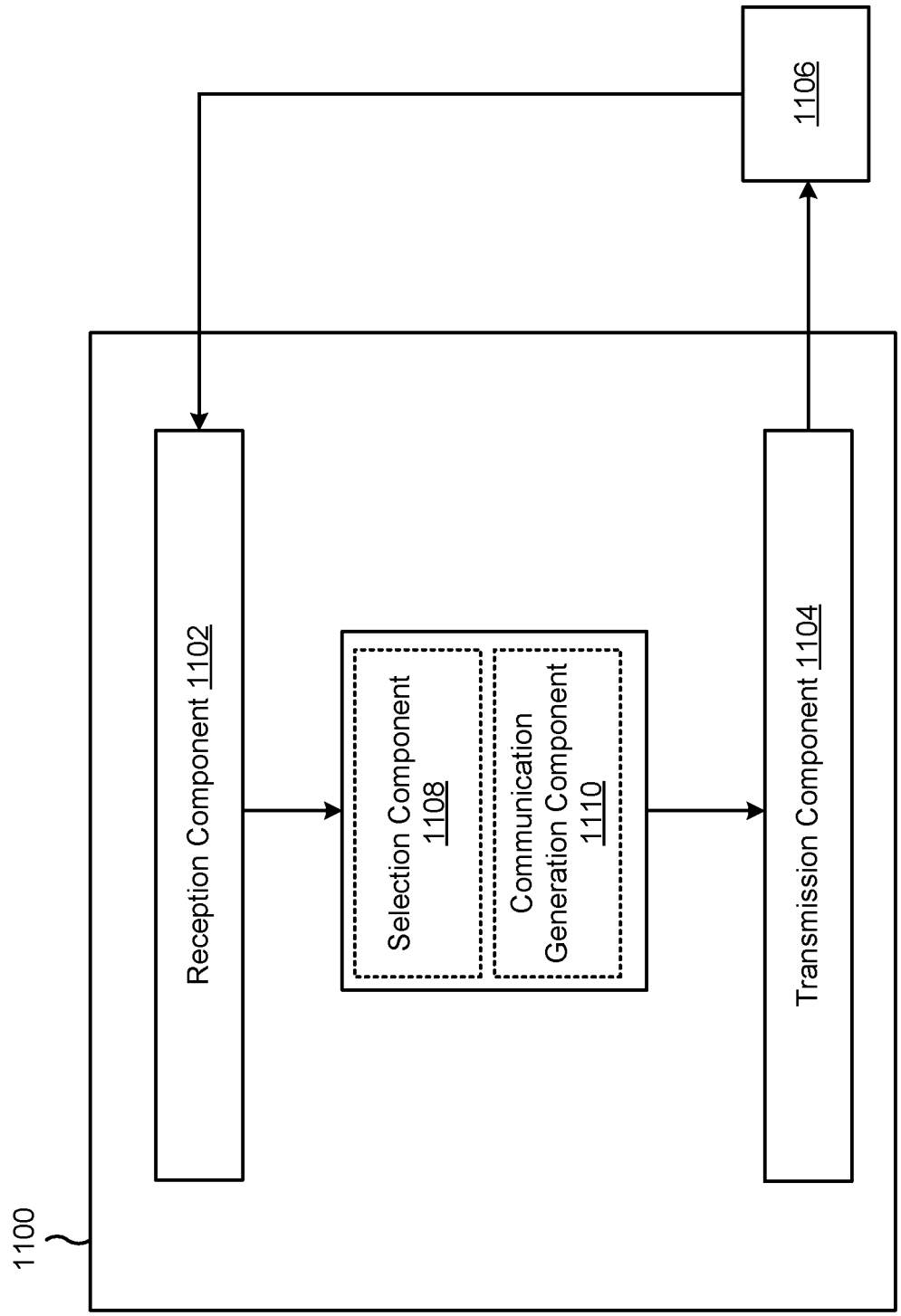

FIG. 11 is a block diagram of an example apparatus 1100 for wireless communication. The apparatus 1100 may be a UE (such as the UE 120 depicted in, and described in connection with, FIG. 1-10 or 12A-12B), or a UE may include the apparatus 1100. In some aspects, the apparatus 1100 includes a reception component 1102 and a transmission component 1104, which may be in communication with one another (for example, via one or more buses or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a selection component 1108, or a communication generation component 1110, among other examples.

In some aspects, the apparatus 1100 may be configured to perform one or more operations described herein in connection with FIGS. 6, 7A, 7B, 7C, 7D, 12A and 12B. Additionally, or alternatively, the apparatus 1100 may be configured to perform one or more processes described herein, such as process 900 of FIG. 9, or a combination thereof. In some aspects, the apparatus 1100 or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the UE described above in connection with FIG. 2.

In some aspects, the reception component 1102 may be a component of a processing system. For example, a "processing system" of the apparatus 1100 may refer to a system including the various other components or subcomponents of the apparatus 1100.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

In some aspects, the transmission component 1104 may be a component of a processing system. For example, a "processing system" of the apparatus 1100 may refer to a system including the various other components or subcomponents of the apparatus 1100.

The processing system of the apparatus 1100 may interface with other components of the apparatus 1100, and may process information received from other components (such as inputs or signals), output information to other components, etc. For example, a chip or modem of the apparatus 1100 may include a processing system, the reception component 1102 to receive or obtain information, and the transmission component 1104 to output, transmit or provide information. In some cases, the "reception component" 1102 may refer to an interface between the processing system of the chip or modem and a receiver, such that the apparatus 1100 may receive information or signal inputs, and the information may be passed to the processing system. In some cases, the "transmission component" 1104 may refer to an interface between the processing system of the chip or modem and a transmitter, such that the apparatus 1100 may transmit information output from the chip or modem. A person having ordinary skill in the art will readily recognize that the second interface also may obtain or receive information or signal inputs, and the first interface also may output, transmit or provide information.

The selection component 1108 may select, for a first subscription in a dual active mode with a second subscription, a modified periodic interval for a communication that is associated with a periodic interval. The transmission component 1104 may transmit, using the first subscription, the communication at a time that is associated with the modified periodic interval.

The selection component 1108 may modify the periodic interval by a value to obtain the modified periodic interval. The communication generation component 1110 may generate the communication at the time associated with the modified periodic interval.

The selection component 1108 may modify the periodic interval by a randomly selected value to obtain the modified periodic interval. The communication generation component 1110 may generate the communication at the time associated with the modified periodic interval.

The selection component 1108 may select a value from a range of values. The selection component 1108 may modify the periodic interval by the value to obtain the modified periodic interval. The communication generation component 1110 may generate the communication at the time associated with the modified periodic interval.

The selection component 1108 may select, for the first subscription, a different modified periodic interval for a different communication that is associated with the periodic interval. The transmission component 1104 may transmit, using the first subscription, the different communication at a time that is associated with the different modified periodic interval.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12A:
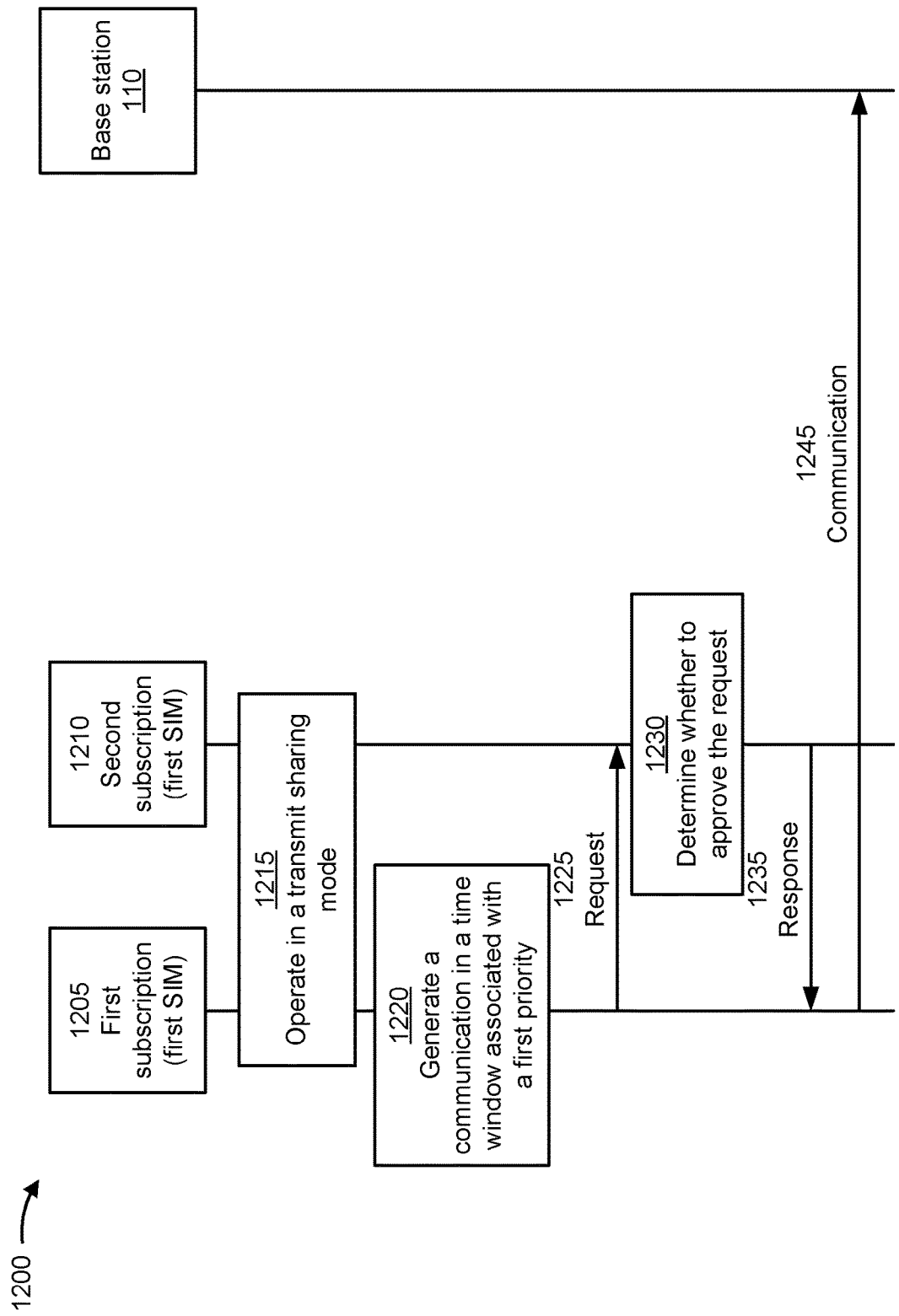
FIGS. 12A and 12B are diagrams illustrating examples of collision mitigation.
Figure 12B:
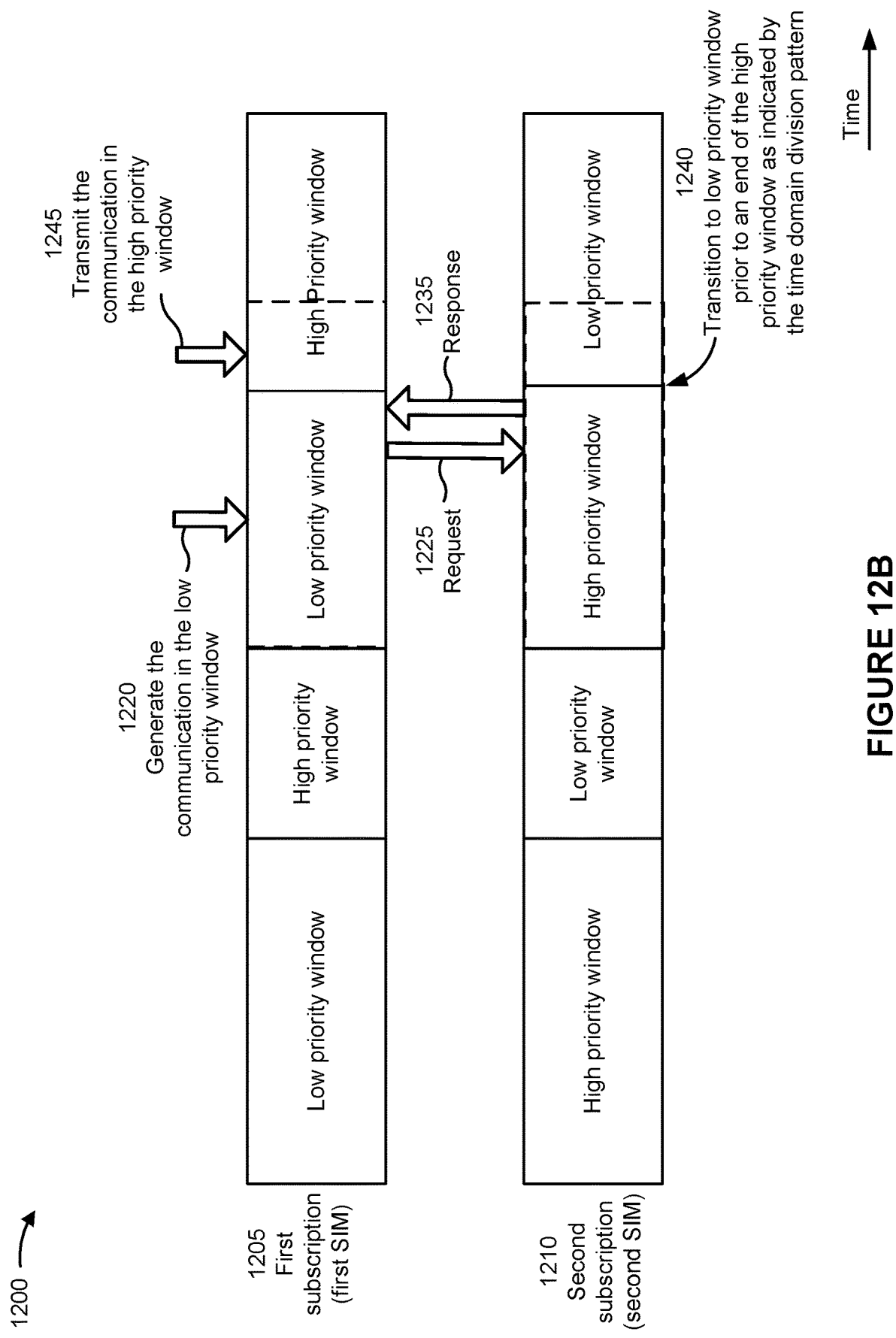

FIGS. 12A and 12B are diagrams illustrating examples 1200 of collision mitigation. As shown in FIG. 12A, a UE 120 (such as the UE 120 depicted in, and described in connection with, FIGS. 1-6, and 7A-7D) may be a multi-SIM UE (such as the multi-SIM UE depicted in, and described in connection with, FIGS. 3-6 and 7A-7D). For example, the UE 120 may include a first subscription 1205 (for example, associated with a first SIM of the UE 120) and a second subscription 1210 (for example, associated with a second SIM of the UE 120). The UE 120 may communicate with a base station 110 (such as the base station 110 depicted in, and described in connection with, FIGS. 1, 2, 6, and 7A-7D) using a wireless network, such as the wireless network 100. Although a single base station 110 is depicted in FIG. 12A, the UE 120 may communicate with multiple base stations 110 (for example, one base station 110 for each subscription).

In some examples, the first subscription 1205 may be associated with a first UE 120 and the second subscription 1210 may be associated with a second UE 120. For example, the first UE 120 (and the first subscription 1205) may communicate with the second UE 120 (and the second subscription 1210) in a P2P scenario, such as a sidelink scenario, or a V2X scenario, among other examples. In some cases, "subscription" and "UE" may be used interchangeably herein.

As shown by reference number 1215, the UE 120 may be configured to operate in a DSDA mode and in a transmit sharing mode. For example, the UE 120 may be capable of concurrent active communication using both subscriptions (both SIMs) of the UE 120. However, the UE 120 may be associated with one or more limitations that inhibit (or prevent) concurrent transmission of communications using both subscriptions (both SIMS) (for example, associated with a transmit sharing mode as described herein). Therefore, the UE 120 may determine (or receive an indication of) a time domain division (TDD) pattern associated with sharing time domain resources between the first subscription 705 and the second subscription 710 in the DSDA mode. For example, the UE 120 may determine (or receive an indication of) a time domain division pattern in a similar manner as described in connection with FIGS. 4, 5, 6, and 7A-7D.

In examples where the first subscription 1205 and the second subscription 1210 are associated with separate or different UEs 120 (rather than the same UE 120), the time domain division pattern may be associated with sharing time domain resources between a first UE 120 and a second UE 120, such as in a P2P scenario, in a similar manner as described elsewhere herein in connection with sharing time domain resources between two subscriptions.

In some aspects, the time domain division pattern may be associated with a periodicity of high priority time windows for a subscription (for example, for a subscription associated with an active voice call session or an active video call session). For example, an active voice call session or active video call session may be associated with periodic traffic (for example, a voice call packet or a video call packet) that occurs every X milliseconds. Therefore, the time domain division pattern may be configured such that high priority time windows occur every X milliseconds to enable the UE 120 to transmit the traffic associated with the subscription (for example, during a high priority time window, as described herein).

In some aspects, the first subscription 1205 may be associated with a voice call or a video call (for example, an active call, or an idle or on hold call). In some aspects, the voice call or the video call may be an active voice call or an active video call. In some other aspects, the first subscription 1205 may be associated with an idle or an on hold call (voice call or video call) and the second subscription may be associated with an active voice call or an active video call.

In some aspects, the UE 120 may have a communication to transmit for the first subscription 1205 (or the second subscription 1210) during a time window associated with a deprioritization of traffic for the first subscription 1205 in accordance with the time domain division pattern. For example, if the first subscription 1205 is associated with an active call (for example, an active voice call or an active video call), the UE 120 may have (for example, may generate or detect a packet ready for transmission) a communication to transmit for the first subscription 1205 in a low priority time window associated with the time domain division pattern (for example, a time window in which communications for the second subscription 1210 are prioritized). As another example, if the first subscription 1205 is associated with an idle or an on hold call and the second subscription 1210 is associated with an active call, the UE 120 may have (for example, may generate or detect a packet ready for transmission) a communication to transmit for the first subscription 1205 in a high priority window associated with the time domain division pattern (for example, a time window in which communications for the second subscription 1210 are prioritized).

For example, a UE 120 (or the first subscription 1205) may identify, detect, or generate an RTCP communication, an RTT communication, or an SIP communication, among other examples, for the first subscription 1205 during a time window associated with a deprioritization of traffic for the first subscription 1205 in accordance with the time domain division pattern. As described in more detail herein, to avoid a collision associated with the time domain division pattern (and traffic associated with the second subscription 1210), the UE 120 may align a transmission timeline for the communication (for example, the RTCP communication, the RTT communication, or the SIP communication) with the timeline of the time domain division pattern (such that the communication is transmitted in a time window in which traffic for the first subscription 1205 is prioritized).

For example, as shown by reference number 1220, the UE 120 may generate a communication (for example, generate a signal, or generate a packet, for the communication) in a time window associated with a first priority for the time domain division pattern. As described herein, the first priority may be associated with a lower priority than a second priority of the time domain division pattern for traffic of the first subscription 1205. For example, if the first subscription 1205 is associated with an active call, the first priority may be associated with a low priority window for the time domain division pattern (and the first subscription 1205). As another example, if the first subscription 1205 is associated with an idle or on hold call, the first priority may be associated with a high priority window for the time domain division pattern (and the second subscription 1210 that is associated with an active call).

For example, as described herein, during a call session, the UE 120 (or the first subscription 1205) may periodically generate an RTCP communication to transmit control information or session information associated with the call session. An RTCP communication may be generated for the first subscription 1205 in a time window associated with the first priority for the time domain division pattern. As another example, an RTT communication may be generated dynamically (for example, based on an input). Therefore, an RTT communication may be generated for the first subscription 1205 in a time window associated with the first priority for the time domain division pattern. As another example, an SIP communication may be generated dynamically at any time (for example, for IMS registration or call control). Therefore, an SIP communication may be generated for the first subscription 1205 in a time window associated with the first priority for the time domain division pattern. Other communications may be periodically or dynamically generated by the UE 120 for the first subscription in a time window associated with the first priority for the time domain division pattern and operations described herein also may apply to those communications.

In some aspects, the UE 120 (or the first subscription 1205) may select, for the communication, a time window associated with the first priority for the time domain division pattern. For example, the UE 120 may select the time window associated with the first priority based on an arrival time of the communication at the UE 120. In other words, the UE 120 may detect or obtain information for the communication. The UE 120 may select the time window associated with the first priority based on generating, detecting, or obtaining the information for the communication. For example, the UE 120 (such as a processing system of the UE 120) may receive or generate information for the communication during the time window associated with the first priority. Therefore, the UE 120 may select the time window associated with the first priority. As described in more detail herein, the first subscription 1205 may refrain from transmitting the communication in the time window associated with the first priority to mitigate a collision associated with the time domain division pattern. The first subscription 1205 may communicate with the second subscription 1210 to coordinate a modification of the time domain division pattern to enable the UE 120 (the first subscription 1205) to transmit the communication in a second time window that is associated with a second priority, as described in more detail herein.

For example, as shown in FIG. 12B, the first subscription 1205 may be associated with an active call session. Therefore, the time domain division pattern may indicate low priority windows and high priority windows for traffic associated with the first subscription 1205. As shown by reference number 1220 in FIG. 12B, the UE 120 may generate a communication for the first subscription 1205 in a low priority time window associated with the time domain division pattern. Therefore, the UE 120 may perform one or more actions (as described in more detail herein) to avoid a collision with traffic associated with the second subscription 1210 (for example, that is prioritized and may be transmitted during the low priority time window).

In some other examples, the second subscription 1210 may be associated with an active call session. Therefore, the time domain division pattern may indicate low priority windows and high priority windows for traffic associated with the second subscription 1210. The UE 120 (for example, the first subscription 1205) may generate a communication for the first subscription 1205 in a high priority time window associated with the time domain division pattern. Therefore, the UE 120 may perform one or more actions (as described in more detail herein) to avoid a collision with traffic associated with the second subscription 1210 (for example, that is prioritized and may be transmitted during the high priority time window).

Returning to FIG. 12A, and as shown by reference number 1225, the first subscription 1205 may transmit, and the second subscription 1210 may receive, a request to transmit the communication. In some aspects, the request may be a request for the second subscription 1210 to transition to a low priority time window. In some aspects, the first subscription 1205 may transmit, and the second subscription 1210 may receive, the request via a subscription interface or SIM interface associated with the UE 120 (for example, in cases where the first subscription 1205 and the second subscription 1210 are associated with the same UE 120). In some other aspects, the first subscription 1205 may transmit, and the second subscription 1210 may receive, the request via over-the-air signaling, such as in a sidelink message (for example, in cases where the first subscription 1205 and the second subscription 1210 are associated with different UEs 120).

In some aspects, the request may indicate information associated with the communication. For example, the request may include an identifier of a service type or category associated with the communication. For example, the request may indicate that the communication is an RTCP communication, an RTT communication, or a SIP communication, among other examples. In some aspects, the request may indicate a priority level associated with communication. For example, the request may indicate a priority level of the service type or category associated with the communication. In some aspects, the UE 120 (for example, the first subscription 1205) may transmit the request based on the priority level associated with the communication satisfying a priority threshold. For example, in some cases, the UE 120 (for example, the first subscription 1205) may transmit the request based on the communication being associated with a high priority (for example, a priority level that satisfies the priority threshold).

As shown by reference number 1230, the UE 120, or the second subscription 1210, may determine whether to approve the request from the first subscription 1205. For example, the UE 120, or the second subscription 1210, may determine whether to transition to a low priority time window earlier than indicated by the time domain division pattern (for example, to enable the first subscription 1205 to transmit the communication). In some aspects, the UE 120, or the second subscription 1210, may determine whether to approve the request based on the priority level associated with the communication. For example, in some aspects, the UE 120, or the second subscription 1210, may determine whether the priority level satisfies the priority threshold. If the priority level satisfies the priority threshold, the UE 120, or the second subscription 1210, may determine to approve the request. If the priority level does not satisfy the priority threshold, the UE 120, or the second subscription 1210, may determine to deny the request.

In some aspects, the UE 120, or the second subscription 1210, may determine whether to approve the request based on the priority level (for example, a first priority level) associated with the communication and a second priority level associated with a communication currently being transmitted or received by the second subscription 1210. For example, the second subscription 1210 may be communicating traffic during the time window in which the request is received from the second subscription 1210. The traffic may be associated with the second priority level. The UE 120, or the second subscription 1210, may compare the first priority level to the second priority level. If the first priority level is higher than (for example, associated with a value greater than) the second priority level, the UE 120, or the second subscription 1210, may determine to approve the request. If the first priority level is lower than (for example, associated with a value less than) the second priority level, the UE 120, or the second subscription 1210, may determine to deny the request. In some aspects, if the first priority level and the second priority level are the same, the UE 120, or the second subscription 1210, may determine to approve the request. In some other aspects, if the first priority level and the second priority level are the same, the UE 120, or the second subscription 1210, may determine to deny the request.

As shown by reference number 1235, the second subscription 1210 may transmit, and the first subscription 1205 may receive, a response to the request. The response to the request may indicate whether the request is approved or denied. In some aspects, the second subscription 1210 may transmit, and the first subscription 1205 may receive, the response via a subscription interface or SIM interface associated with the UE 120 (for example, in cases where the first subscription 1205 and the second subscription 1210 are associated with the same UE 120). In some other aspects, the second subscription 1210 may transmit, and the first subscription 1205 may receive, the response via over-the-air signaling, such as in a sidelink message (for example, in cases where the first subscription 1205 and the second subscription 1210 are associated with different UEs 120).

If the response indicates that the request is denied, then the first subscription 1205 may refrain from transmitting the communication. For example, if the response indicates that the request is denied, then the time domain division pattern may not be modified and the first subscription 1205 and the second subscription 1210 may continue to operate in accordance with the time domain division pattern, in a similar manner as described in more detail elsewhere herein. In some aspects, if the response indicates that the request is denied, then the first subscription 1205 may delay a transmission of the communication, in a similar manner as described in more detail elsewhere herein, such as in connection with FIGS. 7A-7D.

As shown in FIG. 12B, and by reference number 1240, if the UE 120, or the second subscription 1210, determines that the request is approved, then the UE 120 (or the second subscription 1210) may transition to a low priority time window (for example, earlier in time than indicated by the time domain division pattern). In other words, if the UE 120, or the second subscription 1210, determines that the request is approved, then the UE 120 (or the second subscription 1210) may modify the time domain division pattern for the current high priority time window to end the current high priority time window and transition to a low priority time window. As shown by the dashed lines in FIG. 12B, the transition to a low priority time window may occur at an earlier time than indicated by the time domain division pattern. For example, if the UE 120, or the second subscription 1210, were to determine that the request is denied (or if no request were received), then the second subscription 1210 may have otherwise transitioned to the low priority time window at a time indicated by the dashed line in FIG. 12B. In some aspects, the UE 120, or the second subscription 1210, may end a transmission or reception of communications based on determining that the request is approved. For example, the UE 120, or the second subscription 1210, may refrain from transmitting communications associated with the second subscription 1210 after transmitting the response that indicates that the request is approved. In other words, after transmitting the response that indicates that the request is approved, the second subscription 1210 may operate in accordance with the low priority time window for the time domain division pattern as explained in more detail elsewhere herein.

As shown by reference number 1245, the UE 120, or the first subscription 1205, may transmit the communication in a second time window associated with a second priority for the time domain division pattern (for example, in the high priority time window). In some aspects, the time window in which the communication is transmitted by the first subscription 1205 may be associated with the first priority (for example, a low priority) as indicated by the time domain division pattern as originally indicated or configured (for example, as shown by the dashed line in FIG. 12B). However, as described elsewhere herein, the first subscription 1205 and the second subscription 1210 may communicate to coordinate a modification of the time domain division pattern to enable the first subscription 1205 to transmit the communication during the second time window associated with the second priority for the time domain division pattern (for example, in a high priority time window).

As a result, the UE 120, and the first subscription 1205, may be enabled to transmit communications (for example, RTCP communications, RTT communications, or SIP communications, among other examples) that would have otherwise been lost, dropped, or delayed. For example, the UE 120, or the first subscription 1205, may be enabled to transmit a communication, associated with the first subscription 1205, in a time window in which traffic for the first subscription is prioritized (over traffic for the second subscription 1210) by coordinating a modification of the time domain division pattern with the second subscription 1210.

The following provides an overview of some Aspects of the present disclosure:

Aspect 1: A method of wireless communication performed by an apparatus of a user equipment (UE), including: generating, for a first subscription in a dual active mode with a second subscription, a communication in a first time window associated with a first priority for a time domain division pattern with the second subscription; and transmitting, using the first subscription, the communication in a second time window associated with a second priority for the time domain division pattern.

Aspect 2: The method of Aspect 1, where the first priority is associated with a lower priority than the second priority for traffic of the first subscription.

Aspect 3: The method of any of Aspects 1-2, where the first subscription is associated with an active voice or video call, and where transmitting the communication includes: delaying the communication until after the first time window associated with the first priority for the time domain division pattern associated with the active voice or video call; and transmitting the communication after the first time window associated with the first priority.

Aspect 4: The method of any of Aspects 1-3, where the first subscription is associated with an active voice or video call, and where the first priority is associated with a low priority time window for the time domain division pattern associated with the active voice or video call and the second priority is associated with a high priority time window for the time domain division pattern associated with the active voice or video call, and where transmitting the communication includes: delaying the communication until after the low priority time window for the time domain division pattern associated with the active voice or video call; and transmitting the communication during the high priority time window for the time domain division pattern associated with the active voice or video call.

Aspect 5: The method of any of Aspects 1-3, where the first subscription is not associated with an active voice or video call and the second subscription is associated with an active voice or video call, and where transmitting the communication includes: selecting a scheduling request for the communication that is aligned with a low priority time window for traffic associated with the second subscription; transmitting the scheduling request for the communication; and transmitting the communication in the second time window associated with the second priority based on transmitting the scheduling request.

Aspect 6: The method of Aspect 5, where selecting the scheduling request includes: selecting the scheduling request using a transmit reference time for the communication that is based on a processing time and a timing of the scheduling request.

Aspect 7: The method of any of Aspects 1-3 or 5-6, where the first subscription is not associated with an active voice or video call and the second subscription is associated with an active voice or video call, where the first priority is associated with a high priority time window for the time domain division pattern of the second subscription and the second priority is associated with a low priority time window for the time domain division pattern, and where transmitting the communication includes: selecting a scheduling request for the communication that is aligned with the low priority time window for the time domain division pattern of the second subscription; transmitting the scheduling request for the communication; and transmitting the communication in the low priority time window for the time domain division pattern of the second subscription.

Aspect 8: The method of any of Aspects 1-7, where transmitting the communication includes: obtaining the communication from a buffer after the first time window associated with the first priority for the time domain division pattern; and transmitting the communication in the second time window associated with the second priority based on obtaining the communication from the buffer after the first time window associated with the first priority.

Aspect 9: The method of any of Aspects 1-8, where the first subscription is associated with an active voice or video call, and where transmitting the communication includes: obtaining the communication from a buffer in a time window associated with a high priority for the time domain division pattern associated with the active voice or video call; and transmitting the communication in the second time window associated with the second priority based on obtaining the communication from the buffer in the time window associated with the high priority.

Aspect 10: The method of any of Aspects 1-8, where the first subscription is not associated with an active voice or video call and the second subscription is associated with an active voice or video call, and where transmitting the communication includes: obtaining the communication from a buffer in a time window associated with a low priority for the time domain division pattern associated with the active voice or video call; and transmitting the communication in the second time window associated with the second priority based on obtaining the communication from the buffer in the time window associated with the low priority.

Aspect 11: The method of any of Aspects 1-10, where generating the communication includes: delaying, by an application layer of the apparatus of UE, the communication until after the first time window associated with the first priority; and where transmitting the communication includes transmitting the communication in the second time window associated with the second priority based on delaying the communication until after the first time window associated with the first priority.

Aspect 12: The method of any of Aspects 1-10, where transmitting the communication includes: delaying, by a lower layer of the apparatus of UE, the communication until after the first time window associated with the first priority; and transmitting the communication in the second time window associated with the second priority based on delaying the communication until after the first time window associated with the first priority.

Aspect 13: The method of any of Aspects 1-12, where the communication is at least one of a real-time transport protocol (RTP) control protocol (RTCP) communication, a real time text (RTT) communication, or a session initiation protocol (SIP) communication.

Aspect 14: The method of any of Aspects 1-13, where the apparatus of the UE is operating in a transmit sharing mode for the first subscription and the second subscription.

Aspect 15: The method of any of Aspects 1-14, wherein transmitting the communication in the second time window associated with the second priority for the time domain division pattern is based on the second subscription transitioning to a time window associated with the first priority earlier in time than indicated by the time domain division pattern.

Aspect 16: The method of any of Aspects 1-15, further including: transmitting, from the first subscription and to the second subscription, a request to transmit the communication; and receiving, by the first subscription and from the second subscription, a response to the request to transmit the communication indicating whether the response is approved or denied.

Aspect 17: The method of Aspect 16, wherein transmitting the communication in the second time window associated with the second priority for the time domain division pattern is based on the response indicating that the request is approved.

Aspect 18: A method of wireless communication performed by an apparatus of a user equipment (UE), including: selecting, for a first subscription in a dual active mode with a second subscription, a modified periodic interval for a communication that is associated with a periodic interval; and transmitting, using the first subscription, the communication at a time that is associated with the modified periodic interval.

Aspect 19: The method of Aspect 18, where the communication is a real-time transport protocol (RTP) control protocol (RTCP) communication.

Aspect 20: The method of any of Aspects 18-19, where selecting the modified periodic interval includes: modifying the periodic interval by a value to obtain the modified periodic interval; and generating the communication at the time associated with the modified periodic interval.

Aspect 21: The method of Aspect 20, where the value is a prime number.

Aspect 22: The method of any of Aspects 18-21, where selecting the modified periodic interval includes: modifying the periodic interval by a randomly selected value to obtain the modified periodic interval; and generating the communication at the time associated with the modified periodic interval.

Aspect 23: The method of any of Aspects 18-22, where selecting the modified periodic interval includes: selecting a value from a range of values; modifying the periodic interval by the value to obtain the modified periodic interval; and generating the communication at the time associated with the modified periodic interval.

Aspect 24: The method of Aspect 23, where the range of values is associated with a periodic interval for a time domain division pattern for the first subscription and the second subscription.

Aspect 25: The method of any of Aspects 18-24, further including: selecting, for the first subscription, a different modified periodic interval for a different communication that is associated with the periodic interval; and transmitting, using the first subscription, the different communication at a time that is associated with the different modified periodic interval.

Aspect 26: The method of any of Aspects 18-25, where the apparatus of the UE is operating in a transmit sharing mode for the first subscription and the second subscription.

Aspect 27: An apparatus for wireless communication at a first device, including a processor; memory coupled with the processor; and instructions stored in the memory and executable by the processor to cause the apparatus to perform a method of any of Aspects 1-17 or 18-26.

Aspect 28: A user equipment for wireless communication, including a memory and one or more processors coupled to the memory, the one or more processors configured to perform a method of any of Aspects 1-17 or 18-26.

Aspect 29: An apparatus for wireless communication, including at least one means for performing a method of any of Aspects 1-17 or 18-26.

Aspect 30: A non-transitory computer-readable medium storing code for wireless communication, the code including instructions executable by a processor to perform a method of any of Aspects 1-17 or 18-26.

Aspect 31: A non-transitory computer-readable medium storing one or more instructions for wireless communication, the one or more instructions including one or more instructions that, when executed by one or more processors of a user equipment, cause the one or more processors to perform a method of any of Aspects 1-17 or 18-26.

The foregoing disclosure provides illustration and description, but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed a user equipment (UE), comprising:
  generating, for a first subscription in a dual active mode with a second subscription, a communication in a first time window associated with a first priority,
    wherein the first subscription is associated with an active voice call or an active video call,
    wherein a time domain division pattern associated with the first subscription includes the first time window associated with the first priority and a second time window associated with a second priority, and
    wherein the first priority is associated with a lower priority than the second priority with respect to traffic of the first subscription;
  delaying the communication until after the first time window associated with the first priority; and
  transmitting, using the first subscription, the communication in the second time window associated with the second priority.

2. The method of claim 1, wherein transmitting the communication comprises:
  transmitting the communication after the first time window associated with the first priority.

3. The method of claim 1, wherein transmitting the communication comprises:
  obtaining the communication from a buffer after the first time window associated with the first priority; and
  transmitting the communication in the second time window associated with the second priority based on obtaining the communication from the buffer after the first time window associated with the first priority.

4. The method of claim 1, wherein transmitting the communication comprises:
  obtaining the communication from a buffer in the second time window associated with the second priority; and
  transmitting the communication in the second time window associated with the second priority based on obtaining the communication from the buffer in the second time window associated with the second priority.

5. The method of claim 1, wherein delaying the communication until after the first time window associated with the first priority comprises:
  delaying, by an application layer of the UE or a lower layer of the UE, the communication until after the first time window associated with the first priority; and
  wherein transmitting the communication comprises transmitting the communication in the second time window associated with the second priority based on delaying the communication until after the first time window associated with the first priority.

6. The method of claim 1, wherein transmitting the communication in the second time window associated with the second priority is based on the second subscription transitioning to a time window associated with the first priority earlier in time than indicated by the time domain division pattern.

7. A user equipment (UE) for wireless communication, comprising:
  a processing system that includes one or more processors and one or more code-storing memories coupling with the one or more processors, the processing system configured to cause the UE to:
    generate, for a first subscription in a dual active mode with a second subscription, a communication in a first time window associated with a first priority,
      wherein the first subscription is associated with an active voice call or an active video call,
      wherein a time domain division pattern associated with the first subscription includes the first time window associated with the first priority and a second time window associated with a second priority, and
      wherein the first priority is associated with a lower priority than the second priority with respect to traffic of the first subscription;
    delay the communication until after the first time window associated with the first priority; and
    output, using the first subscription, the communication in the second time window associated with the second priority.

8. The UE of claim 7, wherein the processing system, to output the communication in the second time window associated with the second priority, is configured to cause the UE to:
  output the communication after the first time window associated with the first priority.

9. The UE of claim 7, wherein the processing system, to output the communication in the second time window associated with the second priority, is configured to cause the UE to:
  obtain the communication from a buffer in the second time window associated with the second priority; and
  output the communication in the second time window associated with the second priority based on the communication being obtained from the buffer in the second time window associated with the second priority.

10. The UE of claim 7, wherein the processing system, to delay the communication until after the first time window associated with the first priority, is configured to cause the UE to:
  delay, by an application layer of the UE or a lower layer of the UE, the communication until after the first time window associated with the first priority; and
  wherein the processing system, to output the communication in the second time window associated with the second priority, is configured to cause the UE to output the communication in the second time window associated with the second priority based on the communication being delayed until after the first time window associated with the first priority.

11. The UE of claim 7, wherein the processing system, to output the communication in the second time window associated with the second priority, is configured to cause the UE to output the communication in the second time window associated with the second priority based on the second subscription transitioning to a time window associated with the first priority earlier in time than indicated by the time domain division pattern.

12. The UE of claim 7, wherein the first priority is associated with a higher priority than the second priority for traffic of the second subscription.

13. The UE of claim 7, wherein the processing system, to output the communication in the second time window associated with the second priority, is configured to cause the UE to:
  obtain the communication from a buffer in the second time window associated with the second priority; and
  output the communication in the second time window associated with the second priority based on the communication being obtained from the buffer in the second time window associated with the second priority.

14. The method of claim 1, wherein the first priority is associated with a higher priority than the second priority for traffic of the second subscription.

15. The method of claim 1, wherein transmitting the communication comprises:
receiving the communication from a buffer in the second time window associated with the second priority; and
transmitting the communication in the second time window associated with the second priority after receiving the communication from the buffer in the second time window associated with the second priority.

16. A method of wireless communication performed by a user equipment (UE), comprising:
generating, for a first subscription in a dual active mode with a second subscription, a communication in a first time window associated with a first priority,
wherein the second subscription is associated with an active voice call or an active video call,
wherein a time domain division pattern associated with the second subscription includes the first time window associated with the first priority and a second time window associated with a second priority, and
wherein the first priority is associated with a higher priority than the second priority with respect to traffic of the second subscription;
delaying the communication until after the first time window associated with the first priority; and
transmitting, using the first subscription, the communication in the second time window associated with the second priority.

17. The method of claim 16, wherein transmitting the communication comprises:
delaying the communication until after a low priority time window associated with the second subscription; and
transmitting the communication after the low priority time window associated with the second subscription.

18. The method of claim 16, wherein transmitting the communication comprises:
selecting a scheduling request for the communication that is aligned with the second time window associated with the second priority;
transmitting the scheduling request for the communication; and
transmitting the communication in the second time window associated with the second priority based on transmitting the scheduling request.

19. The method of claim 18, wherein selecting the scheduling request comprises:
selecting the scheduling request using a transmit reference time for the communication that is based on a processing time and a timing of the scheduling request.

20. The method of claim 16, wherein transmitting the communication comprises:
selecting a scheduling request for the communication that is aligned with a low priority time window associated with the second subscription;
transmitting the scheduling request for the communication; and
transmitting the communication after the low priority time window associated with the second subscription.

21. The method of claim 16, wherein transmitting the communication comprises:
obtaining the communication from a buffer in the second time window associated with the second priority; and
transmitting the communication in the second time window associated with the second priority based on obtaining the communication from the buffer in the second time window associated with the second priority.

22. The method of claim 16, further comprising:
delaying the communication until after a high priority time window associated with the second subscription.

23. A user equipment (UE) for wireless communication, comprising:
a processing system that includes one or more processors and one or more code-storing memories coupling with the one or more processors, the processing system configured to: cause the UE to
generate, for a first subscription in a dual active mode with a second subscription, a communication in a first time window associated with a first priority,
wherein the second subscription is associated with an active voice call or an active video call,
wherein a time domain division pattern associated with the first subscription includes the first time window associated with the first priority and a second time window associated with a second priority, and
wherein the first priority is associated with a higher priority than the second priority with respect to traffic of the second subscription;
delay the communication until after the first time window associated with the first priority; and
output, using the first subscription, the communication in the second time window associated with the second priority.

24. The UE of claim 23, wherein the processing system is further configured to cause the UE to:
delay the communication until after a low priority time window associated with the second subscription.

25. The UE of claim 23, wherein the processing system is further configured to cause the UE to:
select a scheduling request for the communication that is aligned with a low priority time window for traffic associated with the second subscription; and
wherein the processing system, to output the communication in the second time window associated with the second priority, is configured to cause the UE to:
output the scheduling request for the communication; and
output the communication in the second time window associated with the second priority based on the output of the scheduling request.

26. The UE of claim 25, wherein the processing system is further configured to cause the UE to:
select the scheduling request using a transmit reference time for the communication that is based on a processing time and a timing of the scheduling request.

27. The UE of claim 23, wherein the processing system is further configured to cause the UE to:
select a scheduling request for the communication that is aligned with the second time window associated with the second priority; and
output the scheduling request for the communication.

28. The UE of claim 23, wherein the processing system, to output the communication in the second time window associated with the second priority, is configured to cause the UE to:
obtain the communication from a buffer after the first time window associated with the first priority; and
output the communication in the second time window associated with the second priority based on the communication being obtained from the buffer after the first time window associated with the first priority.

29. The UE of claim 23, wherein the processing system, to output the communication in the second time window associated with the second priority, is configured to cause the UE to:
  obtain the communication from a buffer in a low priority time window associated with the second subscription; and
  output the communication in the second time window associated with the second priority based on the communication being obtained from the buffer in the low priority time window associated with the second subscription.

30. The UE of claim 23, wherein the processing system is further configured to cause the UE to:
  delay the communication until after a high priority time window associated with the second subscription.

* * * * *